United States Patent
Pell

(10) Patent No.: US 10,075,672 B2
(45) Date of Patent: Sep. 11, 2018

(54) OPTIMIZING VIDEO CONFERENCING USING CONTEXTUAL INFORMATION

(71) Applicant: Facebook, Inc., Menlo Park, CA (US)

(72) Inventor: Oliver Pell, London (GB)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 15/385,540

(22) Filed: Dec. 20, 2016

(65) Prior Publication Data
US 2018/0176508 A1 Jun. 21, 2018

(51) Int. Cl.
| H04N 7/14 | (2006.01) |
| H04L 29/06 | (2006.01) |
| H04N 7/15 | (2006.01) |
| H04N 19/85 | (2014.01) |

(52) U.S. Cl.
CPC ............ *H04N 7/147* (2013.01); *H04L 65/80* (2013.01); *H04N 7/15* (2013.01); *H04N 19/85* (2014.11)

(58) Field of Classification Search
USPC .................. 348/14.01, 14.08, 14.09
See application file for complete search history.

(56) References Cited

U.S. PATENT DOCUMENTS

| 8,346,864 B1* | 1/2013 | Amidon | H04L 65/1069 709/204 |
| 2008/0158339 A1* | 7/2008 | Civanlar | H04N 7/152 348/14.09 |
| 2014/0063178 A1* | 3/2014 | Krans | H04N 7/142 348/14.08 |
| 2014/0340467 A1* | 11/2014 | Kajarekar | G06K 9/00288 348/14.08 |
| 2014/0362165 A1* | 12/2014 | Ackerman | H04L 65/4076 348/14.07 |
| 2015/0006241 A1* | 1/2015 | Jamal | H04L 67/22 705/7.29 |
| 2015/0074206 A1* | 3/2015 | Baldwin | H04L 51/10 709/206 |
| 2016/0212074 A1* | 7/2016 | Yu | H04N 7/152 |

* cited by examiner

*Primary Examiner* — Quoc D Tran
(74) *Attorney, Agent, or Firm* — Keller Jolley Preece

(57) ABSTRACT

The present disclosure is directed toward systems and methods for optimizing video conferences. For instance, systems and methods described herein optimize both the transmission and display of one or more video conference data streams. Systems and methods described herein optimize the transmission and display of one or more video conference data streams by identifying a context associated with the one or more video conference data streams and optimizing the one or more video conference data streams based on the identified context.

20 Claims, 13 Drawing Sheets

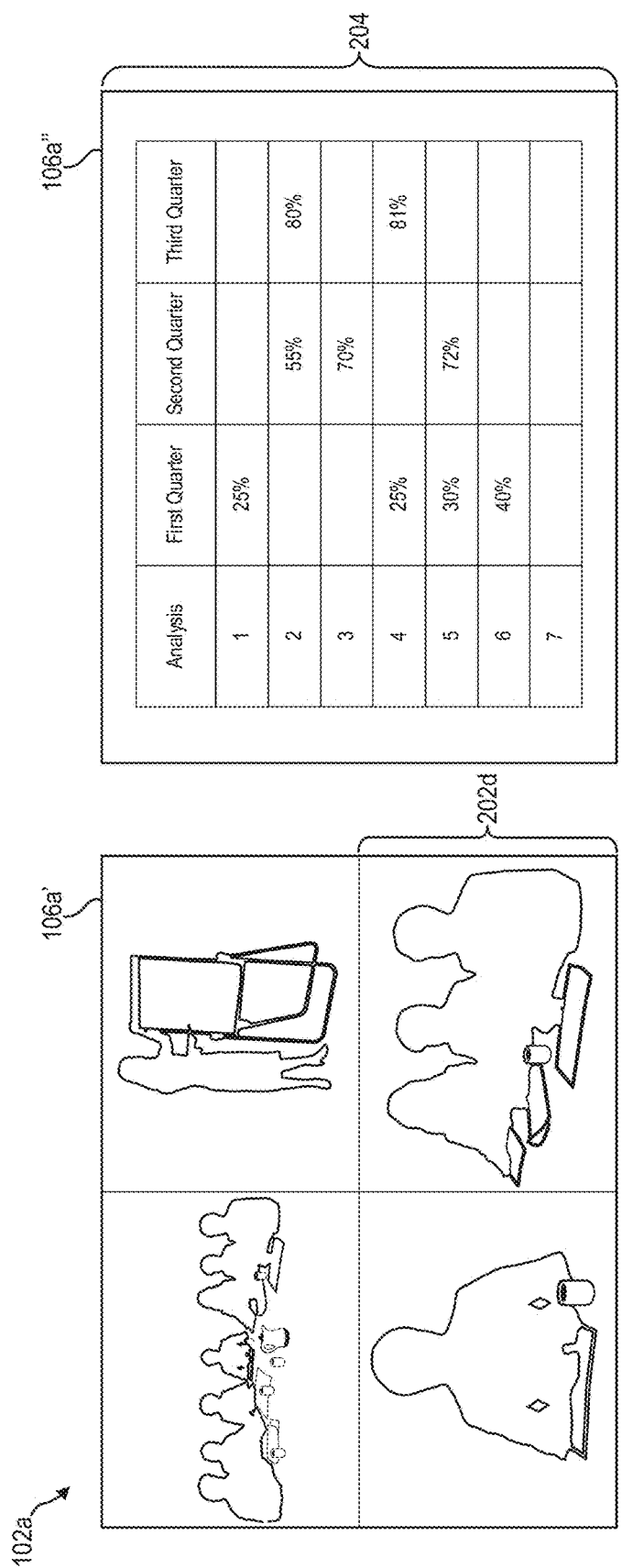

OPTIMIZING VIDEO CONFERENCING USING CONTEXTUAL INFORMATION

BACKGROUND

Video conferencing is an easy and convenient way for people to communicate despite being in different locations. For example, co-workers utilize video conferencing to coordinate projects across worksites, family members and friends utilize video conferencing to keep in touch across long distances, and so forth. Video conferences add an extra dimension of communication to what would otherwise be a standard telephone call in that the participants can observe facial cues and body language.

Additionally, video conferences frequently include a content presentation with a participant video stream. For example, a video conference enabled conference room may include two video screens; one for a video feed of the remote participant, and the other for a visual presentation. To illustrate, in a business meeting video conference between two remote parties, the first video screen can display a video feed showing the face of one participant, while the other video screen can display a spreadsheet of data or a slide presentation.

As video conferencing has become increasingly popular, a significant problem has arisen in that display area is limited. One instance where limited display area is problematic is when a video conference includes more than two remote participants. To illustrate, a video conference may include a participant sitting at a desk in a first location, a group of five participants sitting in a conference room at a second location, and another person working from home at a third location. In this configuration, and using a conventional video conference system, the participant at the first location may see a first window including a view of the five participants at the second location, and second equally-sized window including a view of the participant at the third location. It follows that the five participants in the first window would appear smaller and more distant than the participant in the second window. This can lead to frustration when one of the five participants in the first window is speaking, but is harder to see due to the reduced size and clarity of the display within the first window.

Another instance where limited display area is particularly problematic is when a visual presentation is included as part of a video conference. For example, in video conferencing, display area is at a premium but is generally not utilized appropriately. To illustrate, a visual presentation within a video conference may include presentation slides with large text. Many conventional video conference systems dedicate an entire monitor to the visual presentation, while including any live video feeds (e.g., video feeds of conference participants) on a separate monitor. This means that the separate monitor may be crowded with several video feeds that include several video conference participants, while an entire monitor is dedicated to a single presentation slide. This is typically not the most efficient use of display area and often causes communication confusion within the video conference that results in user frustration as important elements of the video conference are not displayed with appropriate prominence.

Another problem with conventional video conference systems is effectively managing data bandwidth. For example, some conventional video conference systems can compress a video conferencing channel to be broadcast at a lower data rate. Conventional video conference systems, however, typically compress the entire video conferencing channel such that everything displayed in the channel is transmitted with less clarity. This is problematic when a video conferencing channel includes a person who is speaking or is otherwise important but is hard to see clearly after the entire channel has been encoded or compressed.

Thus, there are several disadvantages with conventional video conferencing systems.

SUMMARY

One or more embodiments described herein provide benefits and/or solve one or more of the foregoing or other problems in the art with systems and methods that determine and use context associated with various video conference channels from one or more video conference data streams to optimize the presentation of video conference channels on one or more monitor screens. For example, systems and methods described herein perform a contextual analysis to identify one or more portions of interest within a video conference data stream. In one or more embodiments, systems and methods described herein also preferentially encode or compress the identified portions of interest within the video conference data stream to ensure an acceptable level of video quality within the areas of interest. The systems and methods can also compress portions not included within the portions of interest at a lower level of quality to aid in managing data bandwidth requirements for the video conference data stream. Thus, one or more embodiments described herein optimize video conferences by selectively compressing portions of a video conference data stream at different levels of quality based on contextually identified portions of the video conference data stream.

As briefly mentioned above, one or more examples of the systems and methods determine whether the contents of a video conference channel within a video conference data stream is a video channel that includes conference participants, or whether the video conference channel is a presentation channel that includes presentation content (e.g., slide presentation). The systems and methods can then analyze conference participants in a video channel and/or analyze presentation content characteristics in a presentation channel to optimize a display layout of various video conference channels of a video conference. For example, the systems and methods can modify a display size, a display position, and/or a zoom or crop factor associated with each video conference channel of the video conference.

For instance, based on determining that a video conference data stream includes a video channel of conference participants, the systems and methods can analyze the video channel to identify persons of interest within one or more video conferencing channels. In one or more embodiments, the systems and methods perform a facial recognition analysis on images within the video channel to determine a user identity associated with a conference participant. The systems and methods can then access user information associated with the determined user identity to determine contextual information associated with the conference participant (e.g., job title, relationships between other conference participants, and/or other social or employment related information). Based on the contextual information associated with each conference participant, the systems and methods identify important participants within the video conference (e.g., based on a score), and accordingly, generate a display of the one or more video channels that is optimized based on the identified important participants.

Furthermore, example embodiments of the systems and methods optimize the display of one or more received video conference data streams based analyzing presentation content within a presentation channel of one or more received video conference data streams. For example, in one or more embodiments the systems and methods determine or identify one or more content characteristics within presentation content of a presentation channel (e.g., type of presentation content, size of font, quantity of words). Using the determined content characteristics of the presentation content, the systems and methods optimize a display of the presentation channel to efficiently and effectively present the presentation content (e.g., optimize the display size of the presentation channel to increase the readability of the presentation content).

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which:

FIGS. 3A-3D illustrate an additional examples of video conferencing displays in accordance with one or more embodiments;

DETAILED DESCRIPTION

Figure 1:
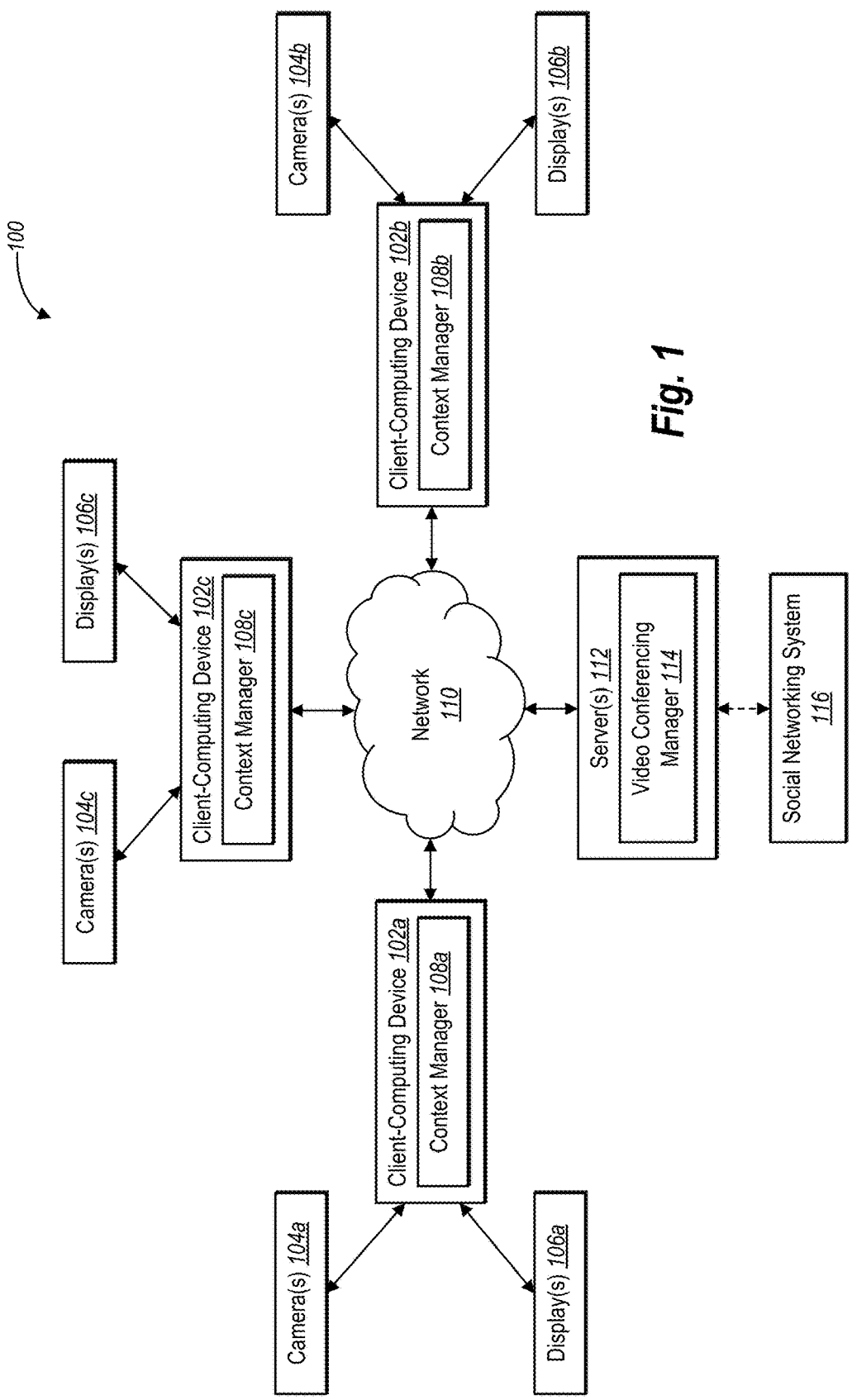
FIG. 1 illustrates a schematic diagram of a video conferencing system in accordance with one or more embodiments.

One or more embodiments described herein provide a video conferencing system for optimizing display capabilities of video conferences based on social context and presentation content characteristics of a video conference. For example, example embodiments of the video conferencing system optimize a video conference data stream by identifying an importance of one or more portions of video content and selectively compressing the video conference data stream based on the identified importance of the one or more portions. In addition to selectively compressing a video conference data stream, example embodiments of the video conference system can further optimize a display of multiple video conference channels by modifying the position, size, zoom factor, crop factor, and other display properties of the multiple video conference channels based on the determined social context and presentation content characteristics associated with the multiple video conference channels.

In one or more embodiments, the video conferencing system identifies areas of importance in a video conference data stream based on determining a social context of the video conference. In at least one embodiment, the video conferencing system analyzes content within a video conference data stream to determine a social context of a video conference. For instance, the social context of a video conference is a purpose (e.g., social circumstance) that corresponds to a video conference. Additionally, the video conferencing system may determine the identity of participants within the video conference, the organizations with which the participants are associated, and/or other user information to provide contextual insight regarding the video conference. The video conferencing system then uses the determined social context and participant identities to optimize the video conference presentation.

In particular, and by way of illustration, in one or more embodiments, the video conferencing system, includes client-computing devices that can both send and receive video conference data streams. In one or more embodiments, when capturing and sending a video conference data stream, the video conferencing system causes the client device to analyze captured video content to determine social context of the captured video. For example, the video conference system can analyze the captured video content and identify that the video content includes a conference room with ten participants to determine that the video content indicates a company meeting.

In addition, the video conferencing system can determine the identity of the ten participants, and based on the social context of the company meeting, the video conferencing system can identify one or more "important" participants based on user information associated with the identified ten participants. As used herein, the term "important" refers to the general concept of significant or relevant content of a video conference (e.g., significant participants or relevant presentation content). The video conferencing system then lossily compresses the captured video so that the portions of the video content that include the important participants are compressed at a higher quality rate than the compression rate used on portions of video content associated with participants that are not deemed important based on the social context. In at least one embodiment, the video conference system compresses one or more portions of video content by selecting a higher amount of quantization for that particular area of the image.

In at least one embodiment, the video conferencing system identifies one or more "important" participants by first performing facial recognition on captured video in order to determine each video conference participant's identity. In one or more embodiments, a video conference participant's identity includes one or more of the participant's name, address, social networking system identifier, employee identifier, and so forth. In one or more embodiments, the video conferencing system identifies a video conference participant by matching an image of the participant taken from the video conference data stream to a known image of the participant (e.g., stored within an employee database or within the social networking system).

Based on determining participant identities, the video conferencing system accesses user information for each identified participant within the captured video content. In one or more embodiments, user information includes any type of information associated with an identified video conference participant. For example, the video conferencing system can access user information including a participant's employment information from human resource records maintained by the participant's employer. Additionally, the video conferencing system can access social networking system information associated with the participant from a social networking system. Social networking system information can include the participant's social networking system profile information, activity history, co-user information, relationships, and so forth.

Using the accessed user information associated with each identified participant, the video conferencing system determines the significance or "importance" of each participant. For instance, the video conferencing system can determine a video conference participant is "important" when the social context of the video conference (e.g., company meeting) and user information associated with the participant (e.g., company title) indicates that the video conference participant is likely the most relevant or significant participant within the video conference. For example, if the social context of a video conference is a sales presentation, the video conferencing system considers the person receiving the sales presentation to be important. In another example, if the social context of a video conference is a team brainstorming meeting, the video conferencing system can consider the team leader to be important.

Based on the video conferencing system determining that at least one of the video conference participants in the captured video content is important, the video conferencing system causes the client device to preferentially compress or encode the video content to send within a video conference data stream. For example, in one or more embodiments, the video conferencing system preferentially compresses video content with multiple compression rates resulting in higher and lower video quality portions of video. Accordingly, in at least one embodiment, the video conferencing system causes the client device to lossily compress non-important portions of captured video content while compressing other portions of the captured video corresponding to the important video conference participants at a higher quality compression rate (e.g., resulting in higher video clarity).

In addition to selectively compressing video content within a video conference data stream, the video conferencing system can cause a client device that receives video conference data streams to generate an optimized display layout. In one or more embodiments, the video conferencing system can optimize a display of various video conference channels based on social context, as discussed above. For example, the video conference can determine a purpose of a video conference, participants of a video conference, important or significant rankings or scores associated with the various participants, as well as other information. Based on the social context, the video conferencing system can generate a display layout that favors the display of important participants.

In addition to determining social context associated with one or more video conference data streams, the video conferencing system can also analyze presentation content (e.g., presentation slides, spreadsheets, digital media) to determine the most efficient and effective way to display the presentation content. For example, the video conferencing system can identify a presentation channel within a video conference data stream and determine the size of font within a slide presentation, the significance of information shown within a spreadsheet, or other content characteristics that indicate the significance of presentation content within a presentation channel of the video conference. Based on the content characteristics of presentation content, the video conferencing system can optimize a display of the presentation channel for the video conference.

In one or more embodiments, the video conferencing system optimizes the display of video conference channels based on the determined social context and presentation content characteristics. For example, based on the determined social context information, the video conference system can modify a display size of a video conference channel, provide presentation focus by zooming in on a particular portion, and/or reposition one or more display locations of one or more video conference channels. Accordingly, the optimized display layout presents one or more video conference channels in an intuitive manner that increases the communication effectiveness of the video conference by focusing on relevant or significant portions and content of one or more video conference channels.

In addition, the video conferencing system creates computational efficiencies by optimizing the transmission and display of one or more video conference data streams. For example, the video conferencing system facilitates faster transmission speeds by selectively compressing non-important portions of video content for use in one or more video conference data streams. Additionally, the video conference system increases display efficiency and effectiveness by strategically maximizing the effectiveness of available display area of a monitor based on favoring the display of important participants and content within a video conference, and disfavoring the display of unimportant participants or irrelevant content.

FIG. 1 illustrates a schematic diagram of an example environment and implementation of the video conferencing system 100. As shown in FIG. 1, the video conferencing system 100 is implemented across client-computing devices 102a, 102b, 102c, each operating an instance of the context manager 108a, 108b, 108c. Furthermore, each client-computing device 102a, 102b, 102c is associated with at least one camera 104a, 104b, 104c and at least one display 106a, 106b, 106c. In one or more embodiments, the video conferencing system 100 further includes a server 112 that includes a video conferencing manager 114, which can communicate with a social networking system 116. In one or more embodiments, the client-computing devices 102a, 102b, 102c and the video conferencing manager 114 communicate via the network 110, which may include one or more networks and may use one or more communication platforms or technologies suitable for transmitting data and/or communication signals. Although the example environment illustrated in FIG. 1 includes three client-computing devices 102a, 102b, 102c in additional embodiments, the video conferencing system 100 can include any number of client-computing devices communicatively coupled via the network 110.

As will be described in more detail below, the context manager 108a, 108b, 108c as described with regard to FIG. 1 performs context and content analysis, selectively compresses one or more video conference data streams, and optimizes one or more displays. For each client computing device, for example, client-computing device 102a, the context manager 108a can perform the various functions and methods described herein related to video captured at the client-computing device 102a prior to sending a video conference data stream from the client-computing device 102a. In addition, or alternatively, the client-computing device 102a can perform the various functions and methods described herein related to a video conference data stream provided by other client-computing devices (e.g., 102b, 102c). Additionally, in one or more embodiments, the server 112 can perform the various functions and methods described herein. For example, in some embodiments, the preferential encoding systems and methods are performed on a client-computing device that transmits a video conferencing data stream, while the display optimizing systems and methods are performed on a client-computing device that receives a video conferencing data stream.

Figure 2A:
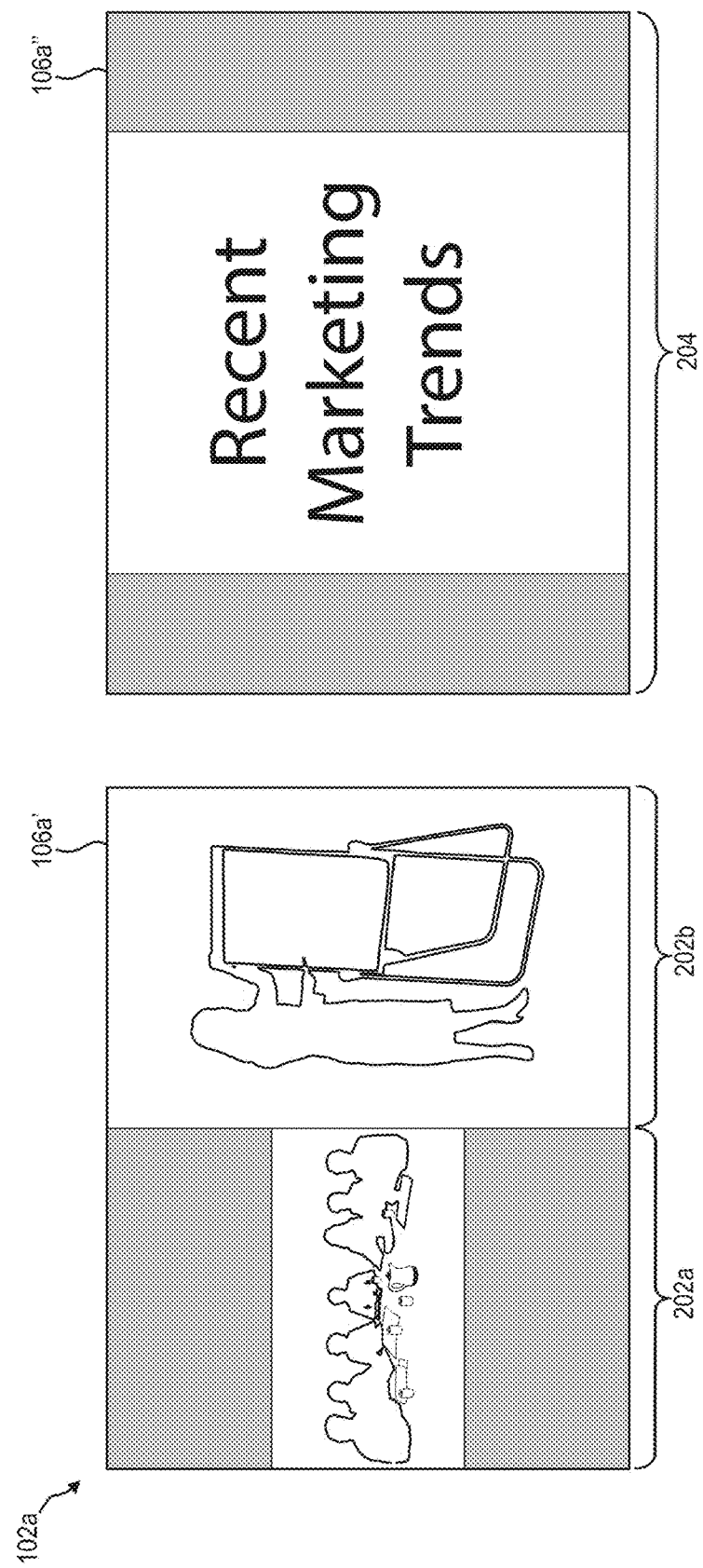
FIGS. 2A-2B illustrate examples of video conferencing displays in accordance with one or more embodiments.

Notwithstanding the particular computing device that performs one or more particular steps, FIGS. 2A-3D and the description that follows illustrate example embodiments of various functions, features, methods, and results of the context manager 108a, 108b, 108c. For example, as shown in FIG. 2A, the client-computing device 102a (as shown in FIG. 1) has display 106a' and display 106a". In one or more embodiments, the displays 106a', 106a" are computer monitors connected to a central processing unit of the client-computing device 102a. In additional or alternative embodiments, the displays 106a', 106a" can be televisions, projected displays, display windows on a single computer monitor, and so forth.

As mentioned above, a video conference can incorporate the use of one or more video conference data streams. As used herein, a "video conference data stream" includes digital media data that is sent from one computing device to another computing device. For example, a video conference data stream can include video and/or audio data that is captured by a camera and microphone and communicated during a video conference between two users. In addition, a video conference data stream can include one or more video conference channels. For example, a video conference data stream can include a first video channel that includes video and audio content of a participant in a video conference. Additionally, the video conference data stream can include one or more presentation channels that include presentation content, such as a slide presentation, spreadsheets, monitor sharing, and/or other electronic documents that can be referenced during a video conference.

For example, as illustrated in FIG. 2A, the video conferencing system 100 can display one or more video channels 202a, 202b in addition to a presentation channel 204. In one or more embodiments, the video channels 202a, 202b include live video streams of video conference participants. For instance, the video channel 202a includes a live video stream of the video conference participants who are utilizing the client-computing device 102b to participate in the video conference. Similarly, the video channel 202b includes a live video stream of the video conference participant who is utilizing the client-computing device 102c to participate in the video conference. Although the display 106a' shows two video channels 202a, 202b, in additional embodiments, the display 106a' can include fewer or additional video channels.

Also shown in FIG. 2A, the video conferencing system 100 provides the presentation channel 204 on the display 106a" of the client-computing device 102a, the presentation channel 204 being broadcast from the client-computing device 102c. For instance, and as shown in FIG. 2A, the presentation channel 204 includes a presentation slide. Although the display 106a" shows a single presentation channel 204, in additional embodiments, the display 106a" can include additional presentation channels. Additionally, although the video conferencing system 100 displays all video channels 202a, 202b on the display 106a' and the presentation channel 204 on the display 106a" of the client-computing device 102a, in additional or alternative embodiments, the video conferencing system 100 can display any combination of video channel and presentation channel on any display of the client-computing device 102a.

As mentioned above, the video conferencing system 100 selectively compresses one or more video conference data streams based on social context and content analysis. For example, the context manager 108a, 108b, 108c installed on the client-computing device 102a, 102b, 102c, respectively as shown in FIG. 1, identifies one or more areas of importance in a broadcast video channel and compresses the broadcast video channel around the areas of importance. Thus, the video conference system 100 broadcasts the areas of interest with greater clarity than the areas of non-interest.

With reference to FIG. 2A, the context manager 108b of the client-computing device 102b can selectively compress the video channel 202a displayed on the display 106a' of the client-computing device 102a. Similarly, the context manager 108c of the client-computing device 102c can selectively compress the video channel 202b displayed on the display 106a' of the client-computing device 102a. In one or more embodiments, the context manager installed on any client-computing device selectively compresses a video channel based on an analysis of the social context of the video channel, as well as on an analysis of the content of the video channel.

To illustrate, in order to analyze the social context of the video channel 202a, the context manager 108b of the client-computing device 102b begins by performing image analysis on a still image taken from the video channel 202a. For example, in one or more embodiments, the context manager 108b extracts a still image from the video channel 202a on regular intervals (e.g., every 1 second, every 10 seconds, every 20 seconds, every 60 seconds, every 2 minutes, etc.). In at least one embodiment, the context manager 108b extracts a still image from the video channel 202a by extracting a single frame from the video stream comprising the video channel 202a. Alternatively, rather than capturing a still image on regular intervals, the context manager 108b can capture a still image from the video stream comprising the video channel 202a every time movement is detected within the video channel 202a.

Once the context manager 108b has extracted a still image from the video channel 202a, the context manager 108b analyzes the still image for areas of importance. In one or more embodiments, an area of importance can be a participant, a whiteboard, a television screen, a computer monitor, etc. Accordingly, the context manager 108b utilizes image processing or computer vision to detect or otherwise recognize shapes, objects, and/or colors. In one or more embodiments, the context manager 108b further utilizes machine learning and neural networks to extrapolate from the recognized shapes and colors whether an area within a still image is a person, a piece of furniture, a wall, and so forth.

If the context manager 108b determines that an area in the still image is a participant, the context manager 108b utilizes facial recognition to identify the participant. For example, in one or more embodiments, the context manager 108b identifies distinguishing features of the participant's face (e.g., distance between the eyes, width of the nose, depth of the eye sockets, shape of the cheekbones, length of the jaw line, etc.) and seeks to match those features to a known image of the participant. In at least one embodiment, the context manager 108b seeks to match the image of the participant in the still image to a known image of the participant from company human resources records, social networking system information, internet searches, personnel databases, and so forth. The context manager 108b determines that a match has been found when the context manager 108b matches a number of distinguishing features between the image of the participant in the still image and a known image of the participant above a predetermined threshold amount.

Based upon the context manager 108b having identified a participant in the still image taken from the video channel 202a, the context manager 108b next determines whether the identified participant is "important." As discussed above, an identified participant is important when the participant is a likely focus of the video conference. For example, in a video conference where all participants are employed by the same company, the company CEO is likely a focus of the video conference.

In order to determine whether an identified participant in the video channel 202a is important, the context manager 108b accesses information associated with the video conference, information associated with the identified participant, and/or information associated with a participant that will receive the video channel (e.g., the participant associated with the client computing device 108b having monitors 106a' and 106a" shown in FIG. 2A). For instance, the context manager 108b can determine a relationship of the identified participant with a predicted context (e.g., purpose) of the video conference (e.g., the identified participant is a team leader of a team video conference). Additionally, the context manager 108b can determine a relationship of the identified participant with the receiving participant (e.g., the identified participant is the receiving participant's boss). Based on identifying and determining contextual relationships between an identified participant, the video conferencing system 100 can selectively compress a video conferencing data stream.

For example, in one or more embodiments, the context manager 108b accesses metadata related to the video conference in order to determine whether an identified participant is important. In one or more embodiments, the video conferencing manager 114, as shown in FIG. 1, hosts the video conference in which the users of the client-computing device 102a, the client-computing device 102b, and the client-computing device 102c are all participating. In that case, the video conferencing manager 114 may store metadata related to the video conference such as, but not limited to, the names and titles of the video conference participants, the locations of the video conference participants, the time and date of the video conference, the stated purpose or title of the video conference (e.g., "Team Brainstorming Meeting"), the technical specifications of the video conference (e.g., the required data bandwidth, the data transfer rate, etc.), and so forth.

Furthermore, in one or more embodiments, the context manager 108b accesses information about the identified participant in order to determine whether the identified participant is important. For example, in at least one embodiment, the context manager 108b accesses company organizational information to determine an identified participant's employment position and seniority within the company. Furthermore, in one embodiment, the context manager 108b can also access the identified participant's calendar, email, and other data specific to the identified participant within either the video conferencing manager 114, the server 112, or within a separate server accessed by the video conferencing manager 114. For example, in one embodiment, the context manager 108b may consider an identified participant more important if his calendar indicates that he attends or is invited to a lot of meetings.

Additionally, in one or more embodiments, the context manager 108b accesses social networking system information specific to the identified participant in order to determine whether the identified participant is important. For example, the context manager 108b accesses social networking system information including, but not limited to, the identified participant's social networking system friends, the identified participant's likes and comments, the identified participant's social networking system posts, the identified participant's clicks and scrolls within the social networking system, and so forth. In at least one embodiment, the context manager 108b accesses social networking system information via the video conferencing manager 114, as shown in FIG. 1. In additional or alternative embodiments, the context manager 108b can access the social networking system 116 directly in response to requesting login information from the user of the client-computing device 102b.

Furthermore, in at least one embodiment, the context manager 108b accesses the social networking system 116 for information related to any relationships or a social proximity between two or more identified participants in a video conference data stream. For example, social networking system information that indicates a relationship between two people can include both people indicating in their social networking system accounts that they work for the same company. In another example, the two people may be social networking system friends, or they may share a number of social networking system friends in common.

Once the context manager 108b has collected information related to an identified participant shown in the video channel 202a, the context manager 108b utilizes the collected information to determine an importance score for the identified participant. Additionally, in one or more embodiments, the context manager 108b places more weight on certain pieces of information. For example, in one embodiment, the context manager 108b places more weight on employment information for an identified participant, when metadata for the video conference indicates the video conference is for work purposes (e.g., a sales team meeting). In that case, the context manager 108b will place more weight on information such as the identified participant's work title, employment seniority, income, etc. than on social networking system information such as the identified participant's number of friends.

In additional or alternative embodiments, the context manager 108b can weight information based on other criteria than the metadata associated with the video conference. For example, if the identified participant has a very high number of social networking system friends, the context manager 108*b* can determine that the identified participant is likely important even if the identified participant's employment information may not explicitly indicate importance. In that case, the context manager 108*b* may more heavily weight the social networking system information associated with the identified participant.

With the identified participant's information appropriately weighted, the context manager 108*b* next calculates a score for the identified participant that indicates the participant's level of importance. In one or more embodiments, the context manager 108*b* calculates an importance score by simply adding together the weighted values associated with all the collected information for the identified participant. In additional or alternative embodiments, the context manager 108*b* can calculate an importance score using a more complex algorithm. For example, the context manager 108*b* can vary weights, types of information used, and other factors based on an identified relationship between a receiving participant and the identified participant.

The context manager 108*b* calculates an importance score for every identified participant shown in the video channel 202*a*. The resulting importance score for the identified participant can be an integer from zero to one-hundred, or a non-integer from zero to one, and indicates the importance of the identified participant. In one or more embodiments, when a resulting importance score is above a predetermined threshold, the context manager 108*b* determines that the identified participant is important. In one or more embodiments, it is possible that no conference participant has an importance score above the predetermined threshold. In such a case, the context manager 108*b* can use a default system or method for compressing the video channel, or alternatively, the context manager 108*b* may rank participant's by importance score and compress the video channel based on the participants' respective importance to one another.

In at least one embodiment, the context manager 108*b* further weights an identified participant's importance score based on speech and body language analysis. For example, the context manager 108*b* generally considers a participant in a video conference to be more important if that participant is speaking. Similarly, the context manager 108*b* generally considers a participant in a video conference to be more important if that participant is moving, standing, or making gestures. In one or more embodiments, the context manager 108*b* determines that an identified participant is speaking by utilizing one or more microphones, and/or by utilizing image processing to recognize body movements and facial gestures that indicate the participant is speaking (e.g., the participant's mouth is open, the participant's hands are moving, etc.). Along related lines, the context manager 108*b* determines that an identified participant is moving or making gestures by utilizing image processing techniques.

As discussed above, the context manager 108*b* also identifies other areas of importance (e.g., a white board, a television screen, and so forth) within a still image taken from a video channel. For example, in one or more embodiments, the context manager 108*b* utilizes image processing techniques to determine that identified shapes within a still image are potential items of importance. The context manager 108*b* then scores each identified item based on a series of criteria to determine each item's level of importance. For instance, if the still image includes a clock hanging on a wall, the context manager 108*b* may not calculate a high score for the clock, as the clock is likely not an item of importance. If the still image includes a whiteboard, the context manager 108*b* may calculate a higher score for the whiteboard as the white board may include writing that is important to the video conference. For instance, the context manager 108*b* can detect the writing content on a whiteboard is changing and in response recognize that the content on the whiteboard is changing, the context manager 108*b* can define the whiteboard as an important item.

Furthermore, if an identified item in the still image is a type of display (e.g., a whiteboard, a television, a computer screen, etc.) the context manager 108*b* can also utilize optical character recognition to determine what is being displayed. For example, the context manager 108*b* may utilize optical character recognition to determine that a whiteboard displays writing that includes phrases like, "ideas for next quarter," "improvements needed," and "team goals." If metadata for the video conference indicates that the purpose of the video conference is a team planning meeting, the context manager 108*b* can utilize machine learning and other heuristics to determine that the writing on the whiteboard is relevant to the meeting, and thus the whiteboard is an item of importance and should be scored accordingly. Based the context manager 108*b* determining a score for every identified item in the still image taken from the video channel 202*a*, the context manager 108*b* determines whether each identified item is important. In one or more embodiments, and similar to an identified participant, the context manager 108*b* determines that an identified item is important if the score for the identified item is above a predetermined threshold.

After the context manager 108*b* has identified the participants and items of importance in the video channel 202*a*, the context manager 108*b* selectively compresses the video channel 202*a* around the participants and items of importance. In one or more embodiments, as mentioned above, the video conferencing system 100 optimizes a video conference by selectively compressing portions of a broadcast video channel so as to save data bandwidth and to speed up transmission of the video channel. Accordingly, in response to identifying participants and items of importance in the video channel 202*a*, the context manager 108*b* of the client-computing device 102*b* compresses all areas within the video channel 202*a* that do not contain a participant or item of importance. In at least one embodiment, the context manager 108*b* compresses unimportant areas within the video channel 202*a* using lossy encoding techniques such that the important areas within the video channel 202*a* are broadcast or transmitted with greater quality (e.g., greater clarity).

Figure 2B:
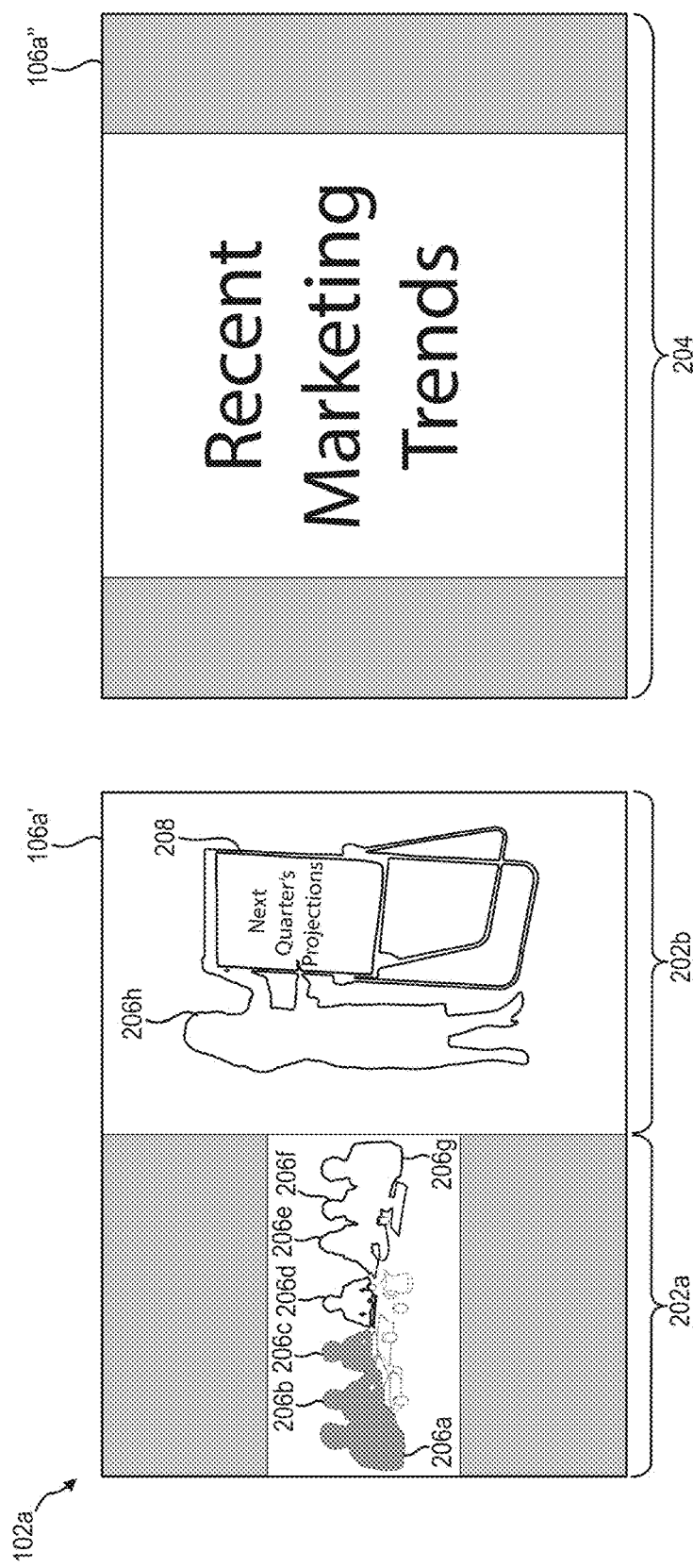

To illustrate, FIG. 2B shows the video channel 202*a* in which participants 206*a*-206*g* sit around a table. In one or more embodiments, the context manager 108*b* of the client-computing device 102*b* utilizes image processing and computer vision to determine that the presence of seven people sitting around the conference room table. The context manager 108*b* next utilizes facial recognition techniques to determine the identity (e.g., a user identity) of each of the seven participants shown in the video channel 202*a*. For example, and as discussed above, an image of each participant is measured against known images of users of the video conferencing system to find a match between a participant image and a known image associated with a known user identity.

Based on determining a user identity of each participant, the context manager 108*b* accesses data associated with each of the identified seven participants from company servers, social networking systems, and so forth in order to determine the importance of each of the seven people. Finally, upon determining that one or more of the participants 206d-206g have an importance score above a predetermined threshold, the context manager 108b selectively compresses the one or more important participants 206a-206c, as well as the conference table and the items thereon, such that the one or more important participants 206d-206g are transmitted with greater clarity at a higher data compression rate than the conference table, non-important participants (e.g., those participants having an importance score below the threshold), and/or other portions of the video image.

For example, in one embodiment, the video conference displayed in the video channels 202a, 202b, and the presentation channel 204 on the displays 106a' and 106a" of the client-computing device 102a includes participants who are conferencing for the purpose of a product development presentation. The participants displayed in the video channel 202a include some team members (e.g., participants 206a-206c), as well as the company CEO (e.g., participant 206d), two potential customers (e.g., participants 206e, 206f), and the company's legal counsel (e.g., participant 206g). Accordingly, the context manager 108b utilizes the processes described above to determine that the participants 206d-206g are important and lossily encodes/compresses the video channel 202a such that the participants 206d-206g are transmitted with greater clarity than the participants 206a-206c. For example, the context manager 108b determines that the CEO (e.g., the participant 206d) is important in light of his company title relative to the company titles of the other people in the room, that the potential customers (e.g., the participants 206e, 206f) are important in light of their lack of company information as well as their high number of social networking system connections, and that the company's legal counsel (e.g., the participant 206g) is important in light of his company title.

The processes described above with reference to the selective compression capabilities of the context manager 108b can be performed by any context manager installed on a client-computing device participating in the video conference that is broadcasting or transmitting a video conference data stream. For example, as shown in FIG. 2B, the context manager 108c of the client-computing device 102c transmits the video channel 202b displayed on the display 106a' of the client-computing device 102a. In the illustrative example, the participant displayed in the video channel 202b includes a team member who is giving the presentation.

Accordingly, the context manager 108c utilizes image processing and facial recognition to identify the participant 206h. The context manager 108c further calculates the importance of the participant 206h using the methods described above with reference to the context manager 108b. In one or more embodiments, the context manager 108c may not calculate a very high importance score for the participant 206h in light of the fact that the participant 206h is a team member with no special title within the company who has a normal number of social networking system connections. In at least one embodiment, however, the context manager 108c further weights the importance score of the participant 206h in light of a determination that the participant 206h is speaking and utilizing body gestures that indicate the participant 206h is giving a presentation. Thus, in light of the context manager 108c calculating an importance score for the participant 206h that is above a threshold amount, the context manager 108c transmits the image of the participant 206h with no added compression.

The context manager 108c further utilizes image processing to determine the importance of the item 208, as shown in FIG. 2B. For example, in one or more embodiments, the context manager 108c identifies the item 208 as a whiteboard easel. The context manager 108c then determines that the item 208 is likely important after utilizing optical character recognition to identify the writing on the whiteboard. In at least one embodiment, the context manager 108c can use machine learning and other heuristics to determine that the writing on the whiteboard (e.g., "Next Quarter's Projections") is related to video conference metadata stored on the video conferencing manager 114 that indicates the purpose of the video conference is a product development presentation. Accordingly, in light of the context manager 108c calculating an importance score for the item 208 that is above a threshold amount, the context manager 108c transmits the image of the item 208 with no compression or with a high quality compression ratio.

In one or more embodiments, a client-computing device can simultaneously broadcast and receive one or more video channels and one or more presentation channels. For the purposes of the examples disclosed herein, however, client-computing device 102b and client-computing device 102c are broadcasting client-computing devices, while the client-computing device 102a is a receiving client-computing device. The selective compression capabilities of the video conferencing system 100 are described with reference to FIGS. 2A and 2B as being performed by a broadcasting client-computing device. In additional or alternative embodiments, a receiving client-computing device may also perform selective compression on video channel.

As mentioned above, the video conferencing system 100 also optimizes the display of one or more received video conference data streams. This functionality is discussed with reference to FIGS. 3A-3D. In one or more embodiments, the video conferencing system 100 places a premium on display space. Accordingly, in one or more embodiments, the video conferencing system 100 can utilize context and content analysis to crop and resize a video conference data stream (e.g., one or more video channels and/or one or more presentation channels), modify a zoom factor (e.g., zoom in or zoom out) of a video conference channel, modify a crop factor (e.g., cropping out part of a video conference channel), and rearrange various video conference channel displays in order to optimize the display space available on one or more monitors associated with a client-computing device.

Figure 3A:
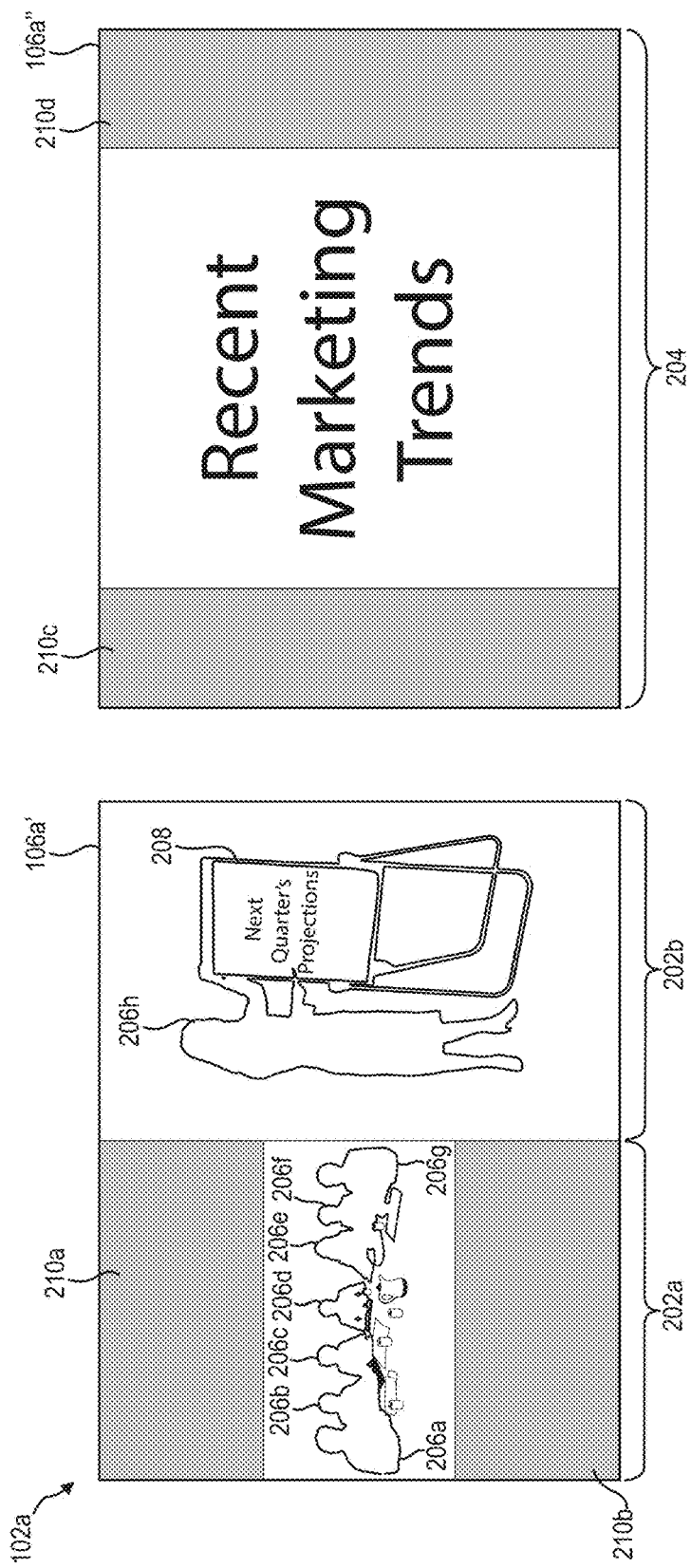

For example, as shown in FIG. 3A, the display 106a' of the client-computing device 102a display the video channels 202a and 202b in a split-screen configuration. Due to the aspect ratio of the camera 104b of the client-computing device 102b, the video channel 202a is rectangular. Accordingly, the client-computing device 102a displays the video channel 202a with mattes 210a and 210b along the top and bottom of the video channel 202a in order to fill up the extra space. Similarly, the client-computing device 102a displays the presentation channel 204 with mattes 210c and 210d in order to fill up the extra space due to the presentation channel 204 being square while the display 106a" is rectangular. In one or more embodiments, the video conferencing system 100 considers the use of the mattes 210a-210d to be a waste of valuable display area on the client computing device 102a.

In some embodiments, the video conferencing system 100 can insert or remove mattes at either the client-computing device 102a or the client-computing device 102b. In other words, the video conferencing system 100 can insert or remove mattes on either the transmitting client or the receiving client. For example, if a transmitting client transmits a 16:9 widescreen video, and the receiving client can only display a 4:3 presentation, the video conferencing system 100 may add mattes to the displayed video at the receiving client in order to correct the aspect ration of the video. Alternatively, if the transmitting client knows the aspect ratio of the display of the receiving client prior to transmission, the transmitting client may insert or remove mattes prior to transmission.

Additionally, as shown in FIG. 3A, the conference participants displayed in the video channel 202a are small, while the conference participant displayed in the video channel 202b is larger. Moreover, the client-computing device 102a utilizes all of the display 106a" to display the presentation channel 204, even though the presentation channel 204 includes text that could be easily read at a smaller size. Accordingly, in at least one embodiment, the video conferencing system 100 considers the arrangement of displays shown in FIG. 3A to be inefficient and not optimized. As such, the video conferencing system 100 utilizes context and content analysis in order to optimize the display of the video channels 202a, 202b and the presentation channel 204.

For example, the context manager 108a begins the display optimization process by utilizing image processing and computer vision to identify participants, objects, and items in the video channel 202a (as described above with reference to FIG. 2A). Next, the context manager 108a performs facial recognition on the identified participants and matches the identified participants to company employment records, internet data, social networking system information, and so forth to determine the identity of each participant within the video channels 202a and 202b. Following this, the context manager 108a utilizes machine learning and/or neural networks in combination with information collected from company databases, internet searches, social networking systems, etc. to calculate a weighted importance score for each identified participant within the video channels 202a and 202b. With the calculated importance scores, the context manager 108a can optimize the display of the participant in the video channels 202a and 202b.

To illustrate, as shown in FIG. 3A, the video channel 202a includes the participants 206a-206g, while the video channel 202b includes the participant 206h. After performing a context analysis, as described above, the context manager 108a of the client-computing device 102a can determine that the participants 206a-206c and 206h are team members, while the participant 206d is the company CEO, the participants 206e-206f are potential clients, and the participant 206g is the company legal counsel. Accordingly, from the identities and importance of the participants 206a-206h, the context manager 108a can determine that the displays 106a' and 106a" should be optimized around the participants 206d-206g.

Figure 3B:
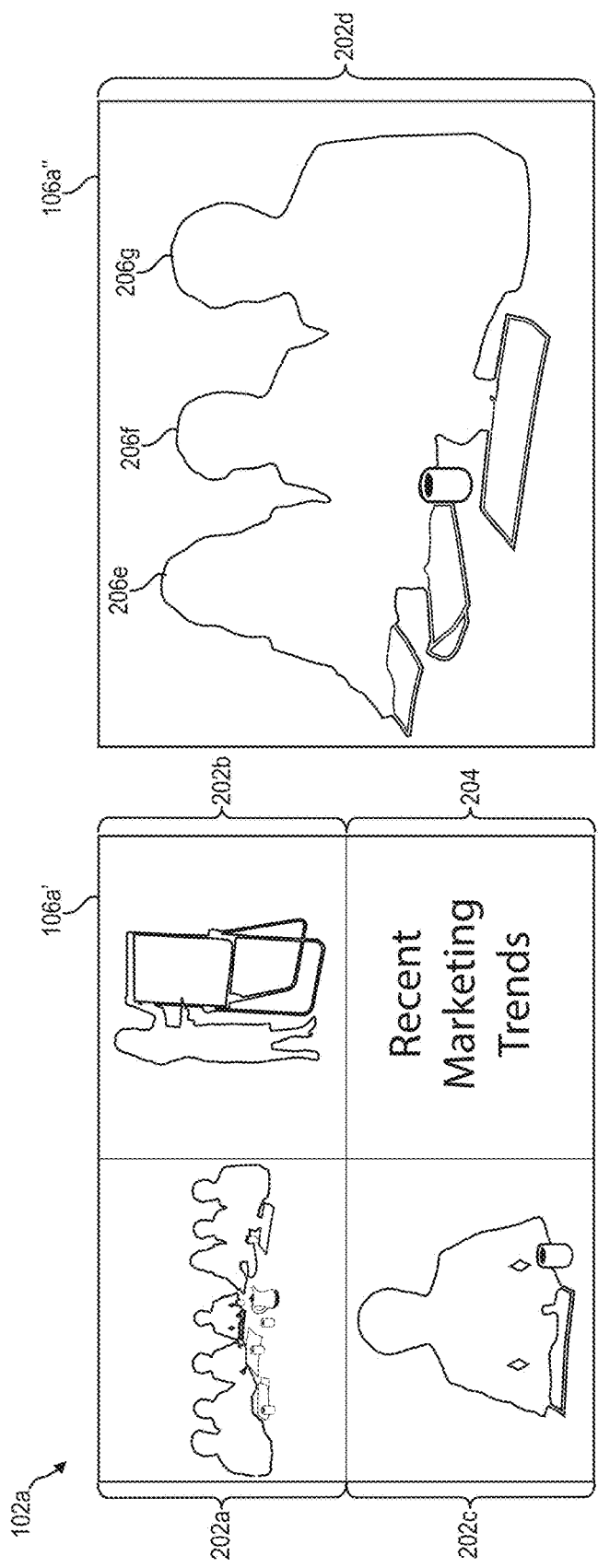
Figure 3C:
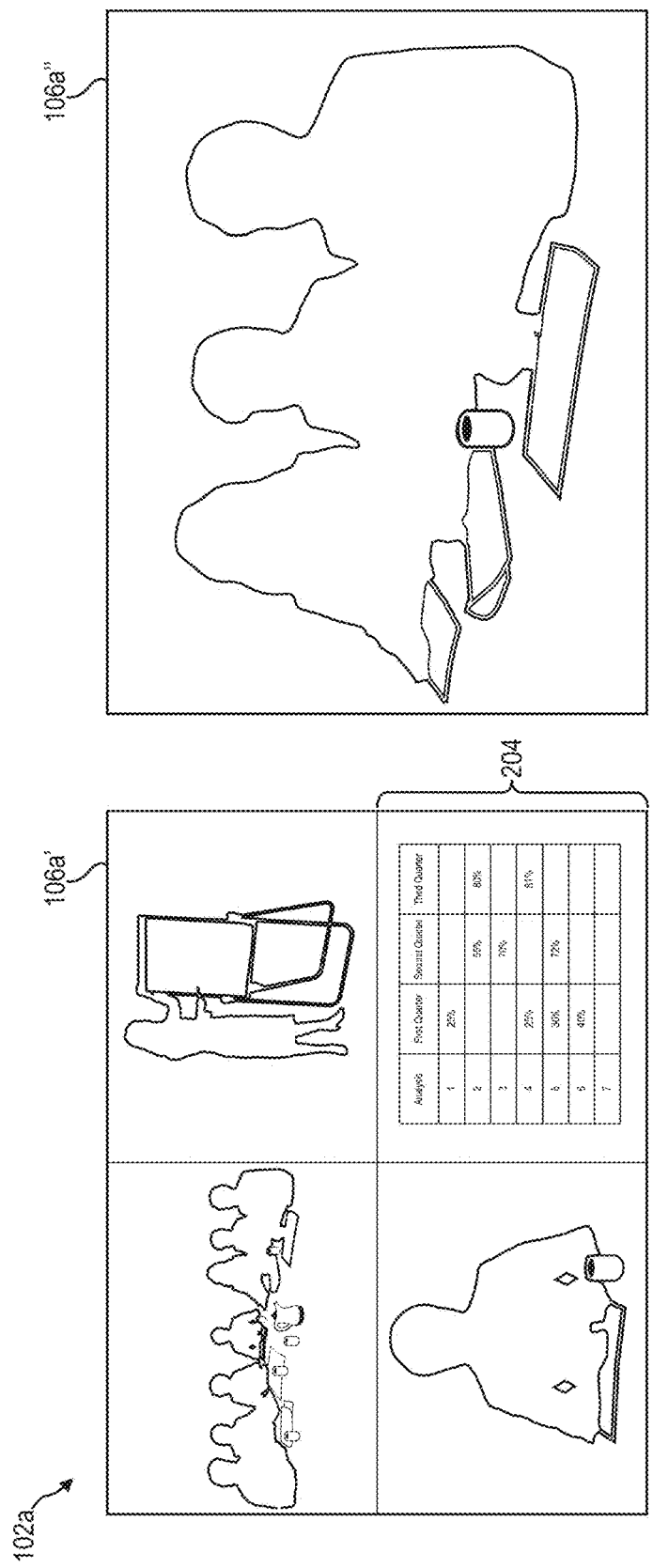

For example, as shown in FIG. 3B, the context manager 108a of the client-computing device 102a has optimized the displays 106a' and 106a" based on context and content analysis. As mentioned above, the context manager 108a can resize a video conferencing channel, split a video conferencing channel, zoom in or out on a video channel, rearrange video channels, and so forth in order to present the user of the client-computing device 102a with the best view of the video conference. Accordingly, as shown in FIG. 3B and in response to determining the participants 206d-206g are the most important video conference participants, the context manager 108a can split the video channel 202a into two additional video channels and present a zoomed in view of the participant 206d (e.g., the company CEO) in the video channel 202c and a zoomed in view of the participants 206e-206g (e.g., the potential clients and the company legal counsel) in the video channel 202d.

In one or more embodiments, the context manager 108a can also analyze information related to the user of the client-computing device 102a to assist in optimizing one or more displays. For example, as discussed above, the context manager 108a generally calculates a higher importance score for a video conference participant who is speaking. However, in certain scenarios, the context manager 108a does not calculate a higher importance score for a speaker based on information related to a viewer of the video conference (i.e., the user of the client-computing device 102a).

For example, as shown in FIG. 3B, the context manager 108a has not zoomed in on the participant 206h, even though the participant 206h is likely a speaker. In at least one embodiment, the context manager 108a may not zoom in on a likely speaker in response to determining that the video conference viewer (i.e., the user of the client-computing device 102a) is likely more interested in watching other video conference participants. To illustrate, in the example shown in FIGS. 3A and 3B, the user of the client-computing device 102a may be a team leader who is familiar with the presentation being given by the participant 206h and who is more interested in watching the responses of the company CEO, the potential clients, and the company legal counsel (e.g., the participants 206d-206g).

In one or more embodiments, the context manager 108a determines that the user of the client-computing device 102a is less interested in a video conference speaker by analyzing company organizational information (e.g., to identify employment relationships between the video conference participants), prior meeting information (e.g., to identify whether the present video conference topic has been previously discussed by the video conference participants), calendar information, emails and other electronic communications, and so forth. In at least one embodiment, the context manager 108a accesses this information related to the user of the client-computing device 102a in response to the user of the client-computing device 102a providing identifying information (e.g., his name, his company logon information, etc.). Alternatively, the context manager 108a can access information related to the user of the client-computing device 102a by querying video conferencing information from the video conferencing manager 114 (e.g., video conference participants, participant locations, etc.).

In one or more embodiments, the context manager 108a further optimizes the displays 106a' and 106a" by cropping portions of one or more video conferencing channel that are not valuable. For example, as shown in FIG. 3A, due to differences between transmitted and displayed aspect ratios, the video channel 202a and the presentation channel 204 include the mattes 210a-210d, respectively. In at least one embodiment, the context manager 108a identifies the mattes 210a-210d using image processing techniques (e.g., that recognize the shape, color, and position of the mattes 210a-210d), and crops the mattes 210a-210d from the video channel 202a and the presentation channel 204. In additional embodiments, the context manager 108a also crops background elements (e.g., a wall, a window, a table top, etc.) that are not important participants or items. Furthermore, after cropping the mattes 210a-210d and other various background elements, the context manager 108a can zoom in and reposition the video conference data stream, such that important people or items are the focus of the video conference data stream. Thus, valuable display area in the displays 106a' and 106a" is not wasted on elements (e.g., mattes, walls, windows, etc.), which add nothing to the video conference.

As mentioned above, the context manager 108a also optimizes the displays 106a' and 106a" by resizing and rearranging video conference data streams. For example, as shown in FIG. 3B, the context manager 108a has resized and rearranged the presentation channel 204 in response to performing content analysis on the presentation channel 204. To illustrate, the context manager 108a performs a content analysis by utilizing image processing, optical character recognition, font recognition, text-size recognition, and so forth to determine the content and the readability of the presentation channel 204. In response to determining that the content of the presentation channel 204 is likely important (e.g., the content includes many words, bullet points, keywords, highlights, etc.), the context manager 108a can resize the presentation channel 204 such that it is larger and easier to read. Similarly, in response to determining that the content of the presentation channel 204 is hard to see (e.g., the font is not heavily weighted, the text-size is small relative to the size of the display 106a", etc.), the context manager 108a can resize the presentation channel 204 such that it is larger and easier to read.

Conversely, in response to determining that the content of the presentation channel 204 is likely not important (e.g., the content includes few words, the content includes no keywords, etc.), the context manager 108a can resize the presentation channel 204 such that it is smaller and takes up less space within the displays 106a' and 106a". Similarly, in response to determining that the content of the presentation channel 204 is easy to see (e.g., the font is bold, the text-size is large relative to the size of the display 106a", etc.), the context manager 108a can resize the presentation channel 204 such that it is smaller and takes up less space within the displays 106a' and 106a". In one or more embodiments, the context manager 108a determines the importance or non-importance of the presentation channel 204 by utilizing machine learning to calculate a weighted score based on the contents of the presentation channel 204.

To illustrate, as shown in FIG. 3A, the presentation channel 204 includes a display slide. In one or more embodiments, the context manager 108a analyzes the presentation channel 204 to determine that the display slide includes few words, large text size, no bullet points, and an easily readable font. Accordingly, the context manager 108a can calculate a weighted score for the presentation channel 204 that indicates that the contents of the presentation channel 204 are likely not important. In response to this determination, the context manager 108a next determines whether another video conference data stream has an importance score that is higher than the score for the presentation channel 204. If any other video conference data stream, or portion of a video conference data stream has an importance score that is higher than the score for the presentation channel 204, the context manager 108a rearranges the display of the video conference data streams such that the most important channels have the most display area.

For example, as shown in FIG. 3B, in response to determining that the participants 206e-206g have high importance scores compared to a low importance score calculated for the presentation channel 204, the context manager 108a rearranges the display of the presentation channel 204 and the video channels 202a-202d. In one or more embodiments, the context manager 108a rearranges the video conference data streams such that the greatest amount of display space is assigned to the video conference data stream with the highest importance score. As illustrated in FIG. 3B, in response to determining that the video channel 202d has the highest importance score, the context manager 108a replaces the presentation channel 204 with the video channel 202d within the display 106a" of the client-computing device 102a.

In one or more embodiments, the context manager 108a also arranges equally sized displays according to importance score. For example, as shown in FIG. 3B, the video channels 202a, 202b, and 202c, and the presentation channel 204 may all have the different importance scores. Despite this, the display 106a' may not be capable of being split into additional or differently sized display areas. Accordingly, the context manager 108a can arrange the video channels 202a-202c and the presentation channel 204 in a left-to-right, top-to-bottom manner based on descending importance scores. For instance, the video channel 202a may have the highest importance score out of the video channels 202a-202c and the presentation channel 204. Accordingly, the context manager 108a places the video channel 202a in the top-right corner of the display 106a' of the client-computing device 102a.

As mentioned above, the context manager 108a captures a still image from every video conference data stream at regular intervals during a video conference. In one or more embodiments, the context manager 108a performs a context and/or content analysis on a video conference data stream each time a still image is captured. Accordingly, in at least one embodiment, each time the context manager 108a captures a still image from a video conference data stream, the context manager 108a can zoom in or out on the video conference data stream, split or consolidate the video conference data stream, rearrange the display of the video conference data stream, and so forth.

In some embodiments, the context manager 108a determines the frequency with which still images are captured based on the amount of activity displayed within the video conference data streams. For example, if a video conference participant is giving a presentation while standing at a white board, the context manager 108a may capture still images of the associated video conference data stream with greater frequency. If a video conference participant is simply sitting at a desk, the context manager 108a may capture still images less often. Alternatively, in at least one embodiment, a user of the client-computing device 102a can define (e.g., via a user settings graphical user interface associated with the context manager 108a) the frequency with which still images are captured via one or more user settings.

To illustrate, the context manager 108a can determine that the contents of the presentation channel 204 have changed in response to capturing a new still image of the presentation change 204. For example, and as shown between the FIGS. 3B and 3C, the contents of the presentation channel 204 have changed from a title slide (i.e., "Recent Marketing Trends") in FIG. 3B, to a slide displaying a spreadsheet in FIG. 3C. In response to determining that the contents of the presentation channel 204 have changed, the context manager 108a again analyzes the contents of the presentation channel 204 in order to calculate a new importance score for the presentation channel 204.

For example, the context manager 108a can analyze the contents of the presentation channel 204 to determine that the presentation channel 204 now displays a spreadsheet (e.g., based on the presence of grid lines), and that the spreadsheet is likely hard to read (e.g., based on the text size relative to the display area). Accordingly, in light of the diminished readability of the presentation channel 204, the context manager 108a may calculate a higher importance score for the presentation channel 204. In one or more embodiments, the context manager 108a then rearranges the various video conference data streams based on the newly calculated importance score for the presentation channel 204. For instance, as shown in FIG. 3D, the context manager 108a has switched the display locations of the presentation channel 204 and the video channel 202d, such that the contents of the presentation channel 204 are enlarged and easier to read on the display 106a" of the client-computing device 102a.

Figure 4:
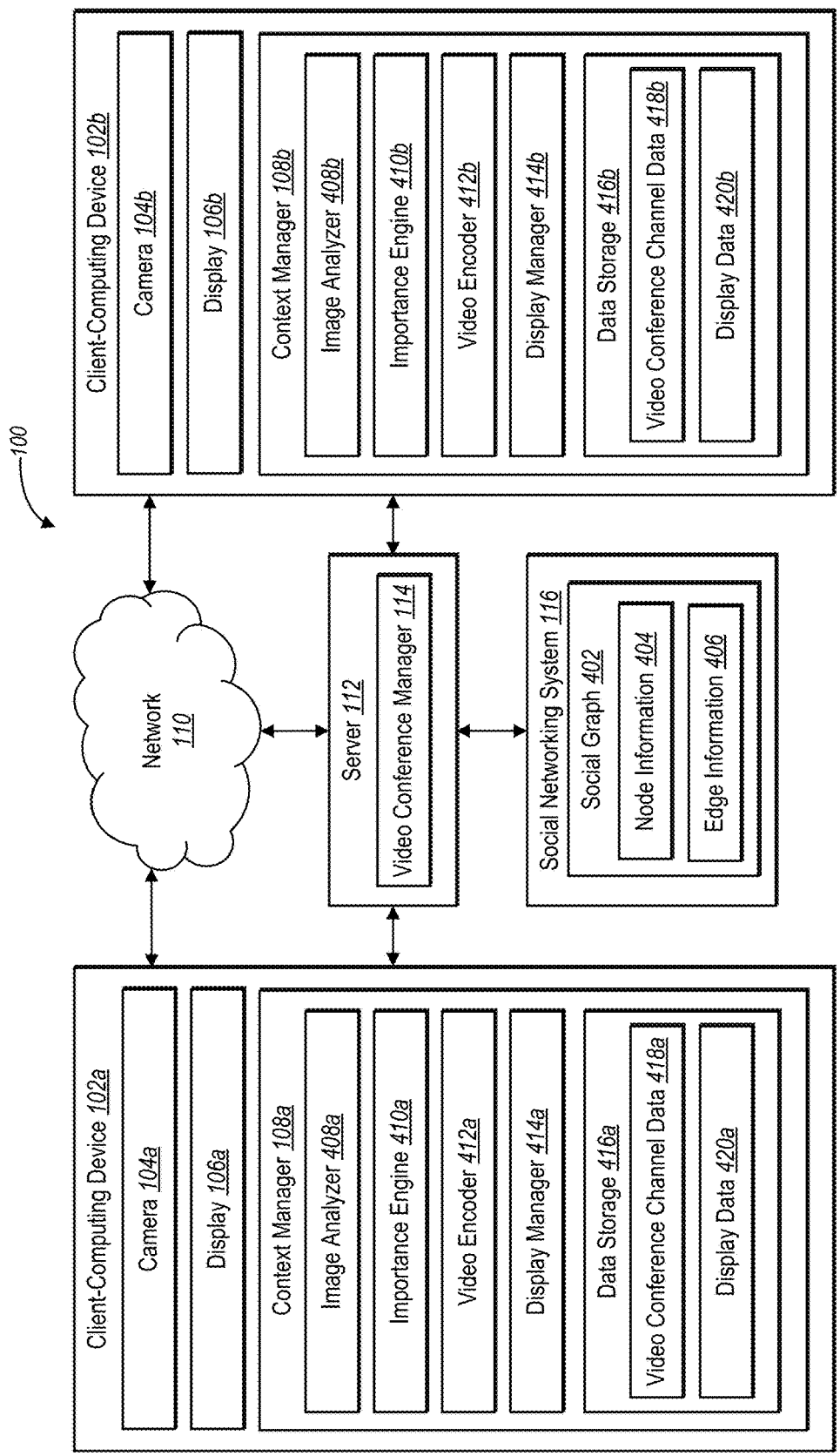
FIG. 4 illustrates a detailed schematic diagram of a video conferencing system in accordance with one or more embodiments.

FIG. 4 illustrates a schematic diagram illustrating an example embodiment of the video conferencing system 100. As shown in FIG. 4, the video conferencing system 100 may include various components for performing the processes and features described herein. For example, as shown in FIG. 4, the video conferencing system 100 may include, but is not limited to, client-computing devices 102a, 102b, at least one server 112 hosting a video conferencing manager 114, and a social networking system 116. In one or more embodiments, each client-computing device 102a, 102b includes at least one camera 104a, 104b, at least one display 106a, 106b, and a context manager 108a, 108b. In one or more embodiments, the context manager 104a, 104b includes an image analyzer 408a, 408b, an importance engine 410a, 410b, a video encoder 412a, 412b, a display manager 414a, 414b, and a data storage 416a, 416b including video conference data stream data 418a, 418b, and display data 420a, 420b.

The client-computing devices 102a, 102b and the server 112 can communicate via the network 110, which may include one or more networks and may use one or more communication platforms or technologies suitable for transmitting data and/or communication signals. In one or more embodiments, the network 110 includes the Internet or World Wide Web. The network 110, however, can include various other types of networking that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 4 illustrates a particular arrangement of the client-computing devices 102a, 102b, the server 112, and the network 110, various additional arrangements are possible. For example, the client-computing devices 102a, 102b may directly communication with the server 112, bypassing the network 110. Additional details relating to the network 110 are explained below with reference to FIG. 8.

While the components of the client-computing device 102a and the client-computing device 102b appear identical, it will be understood that the video conferencing system 100 may operate on a combination of both the client-computing device 102a and the client-computing device 102b, while in other examples, the video conferencing system 100 may only operate only on the client-computing device 102a, or alternatively, only on the client-computing device 102b. For example, as will be described in further detail below, the display optimization features of the video conferencing system 100 may be utilized by both the client-computing device 102a and the client-computing device 102b. Alternatively, the compression features of the video conferencing system 100 may only be utilized by the client-computing device 102a or the client-computing device 102b, depending on which client device is sending a video stream.

As mentioned above, the server 112 includes the video conferencing manager 114. In one or more embodiments, the video conferencing manager 114 hosts and otherwise manages video conferences. For example, in at least one embodiment, the video conferencing manager 114 accepts user input to configure a video conference (e.g., via various user inputs that allow a user to enter time and date, participants, locations, router information, and so forth). In response to receiving video conference configurations, the video conferencing manager 114 establishes a video conference and hosts the established video conference. In one or more embodiments, the video conferencing manager 114 hosts a video conference by accepting one or more connections from client-computing devices 102a, 102b either directly or via the network 110.

In at least one embodiment, the video conferencing manager 114 accesses the social networking system 116. As mentioned above, the video conferencing manager 114 provides social networking system information to one or more of the context managers 108a, 108b for the purposes of context analysis. Accordingly, the social networking system 116 includes a social graph 402 for representing a plurality of users, actions, and concepts. In one or more embodiments, the social graph includes node information 404 and edge information 406. Node information 404 of the social graph 402 stores node information including, for example, nodes for users and nodes for repositories. Edge information 406 of the social graph 402 stores edge information including relationships between nodes and/or actions occurring within the social networking system 116. Further details regarding the social networking system 116, the social graph 402, edges, and nodes is presented below with respect to FIG. 9.

The server 112, the video conferencing manager 114, and the social networking system 116 can be implemented using a computing device including at least one processor executing instructions that cause the video conferencing system 100 to perform the processes described herein. In some embodiments, the video conference manager 114 and the social networking system 116 can be implemented by a single server 112, or across multiple server devices. Additionally, or alternatively, a combination of one or more server devices and one or more client-computing devices can implement the components of the social networking system 116 and/or the video conferencing manager 114. Furthermore, in one embodiment, the components illustrated in FIG. 4 can comprise hardware, such as a special-purpose processing device to perform a certain function. Additionally, or alternatively, the components illustrated in FIG. 4 can comprise a combination of computer-executable instructions and hardware.

The client-computing devices 102a, 102b may include any one of various types of computing devices. For example, the client-computing devices 102a, 102b can include a mobile device such as a mobile telephone, a smartphone, a personal digital assistant, a tablet, a laptop, a smart wearable, or a non-mobile device such as a desktop, a server, and/or another type of computing device. Additional details with respect to the client-computing device are discussed below with respect to FIG. 7.

As shown in FIG. 4, the client-computing devices 102a, 102b include cameras 104a, 104b, respectively. In one or more embodiments, each camera 104a, 104b represents one or more recording devices capable of capturing digital photographs, digital videos, and/or digital sound. In at least one embodiment, the cameras 104a, 104b may be mounted to a display or may be capable of standing alone. Furthermore, in some embodiments, the cameras 104a, 104b include multiple aspects such as, but not limited to, swiveling, zooming in, zooming out, panning, tilting, cropping, and sound-based triangulation. Also as shown in FIG. 4, the client-computing devices 102a, 102b include the displays 106a, 106b. In one or more embodiments, each display 106a, 106b includes one or more display devices such as, but not limited to, televisions, monitors, tablets, smart phones, smart wearables, projectors, and so forth. In one or more embodiments, the cameras 104a, 104b and the displays 106a, 106b are housed as part of the client-computing devices 102a, 102b (e.g., as with a laptop). In alternative embodiments, the cameras 104a, 104b and the displays 106a, 106b are connected, wirelessly or otherwise, to the client-computing devices 102a, 102b (e.g., as with a conference room).

In an embodiment that includes more than one camera associated with the client-computing device 102a and/or the client-computing device 102b, the video conference system 100 can select between the more than one cameras based on social context. For example, if the client-computing device 102a includes three cameras (e.g., positioned around a conference room), the video conference system 100 can select a video stream from one of the three cameras to transmit to the video conference manager 114 based on the social context of the video conference and the important person or thing that is captured by that video stream. To illustrate, the video conference system 100 may transmit video stream from one of the three cameras that is pointed at a customer when the social context of the video conference is a sales pitch meeting that has been organized in an attempt to sell a product to that customer.

As mentioned above, the client-computing device 102a, 102b includes a context manager 108a, 108b. In one or more embodiments, the context manager 108a, 108b optimizes the broadcast and display of one or more video conference data streams. In one or more embodiments, the context manager 108a, 108b is a native application installed on the client-computing device 102a, 102b. For example, the context manager 108a, 108b may be a mobile application that installs and runs on a mobile device, such as a smart phone, a tablet, etc. Alternatively, the context manager 108a, 108b can be a desktop application, widget, or other form of a native computer program. Alternatively, the context manager 108a, 108b may be a remote application accessed by the client-computing device 102a, 102b. For example, the context manager 108a, 108b may be a web application that is executed within a web browser of the client-computing device 102a, 102b.

As mentioned above, and as illustrated in FIG. 4, the context manager 108a, 108b includes an image analyzer 408a, 408b. In one or more embodiments, the image analyzer 408a, 408b gathers image information and performs context and content analysis in order to identify important areas within an image. In at least one embodiment, the image analyzer 408a, 408b also captures the still images from one or more video conferencing channels at regular intervals upon which the context and content analysis are performed.

In one or more embodiments, the image analyzer 408a, 408b begins the process of analyzing an image by analyzing colors and edges within the image to identify shapes. The image analyzer 408a, 408b then utilizes computer vision and machine learning to determine a likelihood that a particular shape is a participant, a table, a wall, etc. If the likelihood is above a predetermined threshold, the image analyzer 408a, 408b identifies a particular shape as a participant, and so forth.

In response to identifying a participant within an image, the image analyzer 408a, 408b continues the context analysis associated with the image by utilizing computer vision to perform facial recognition on the identified participant. In one or more embodiments, and in order to identify the participant, the image analyzer 408a, 408b matches various points within the participant's face to images of identified participants taken from employment records, Internet searches, social networking system information, metadata associated with the video conference, etc. In at least one embodiment, the image analyzer 408a, 408b repeats this process until an identity is determined for every participant in a still image taken from a video conference data stream. In one or more embodiments, the image analyzer 408a, 408b only utilizes social networking system information to assist in facial recognition only when permitted by the privacy settings associated with the identified participant.

In order to perform a content analysis, the image analyzer 408a, 408b utilizes computer vision and other identification techniques to identify every object within a still image taken from a video conference data stream that is not a participant. For example, in one or more embodiments, a still image likely includes items such as papers, walls, windows, chairs, tables, computers, whiteboards, and so forth. In some cases, these items may be important (e.g., such as a white board with information written on it), in other cases these items may not be important (e.g., such as a black wall behind a video conference participant). Accordingly, the image analyzer 408a, 408b determines that an identified shape is a particular item by attempting to match the identified shape to a known item. In one or more embodiments, the image analyzer 408a, 408b makes this determination based on databases of known items, Internet searches, machine learning, computer vision, and so forth.

In at least one embodiment, the image analyzer 408a, 408b also utilizes computer vision, optical character recognition, and machine learning in connection with one or more presentation channels to determine the contents of the presentation channel. For example, the image analyzer 408a, 408b can determine whether a presentation channel includes a slide, a document, a spreadsheet, multimedia, and so forth. Additionally, in one or more embodiments, the image analyzer 408a, 408b also determines other features of the contents of a presentation channel, such as font size, font colors, formatting, and so forth.

In one or more embodiments, the image analyzer 408a, 408b also utilizes computer vision, machine learning, and so forth to identify blank space within a still image taken from a video conference data stream. For example, in one or more embodiments, a video conference data stream may include only video conference participants in front of a solid background. In at least one embodiment, the context manager 108a, 108b may crop out unused space in a video conference data stream to optimize a display. Accordingly, the image analyzer 408a, 408b earmarks this unused space as an area that could potentially later be removed. In one or more embodiments, the image analyzer 408a, 408b identifies blank or unused space by identifying a single color or repeating pattern (e.g., such as with a wall that has a patterned wall paper covering it), and determining what percentage of the still image is taken up by the single color or repeating pattern. If the percentage is over a threshold amount, the image analyzer 408a, 408b determines that the area comprising the single color or repeating pattern is likely blank space that can potentially be later cropped.

With all participants and items identified within a still image, the image analyzer 408a, 408b can also determine a context of the still image. For example, the image analyzer 408a, 408b can determine if a particular still image depicts a team meeting, a sales pitch, a conversation between family members, and so forth. In one or more embodiments, the image analyzer 408a, 408b determines a context of the still image by querying metadata associated with the video conference from which the still image is taken from the video conference manager 114. As mentioned above, the video conference manager 114 maintains metadata related to a video conference that includes the title of the video conference, the participants in the video conference, the technical requirements of the video conference, and so forth.

In addition to video conference metadata, the image analyzer 408a, 408b determines a context of video conference by querying company information associated with one or more of the video conference participants. For example, the image analyzer 408a, 408b can query participants' calendars to identify a title of a meeting occurring at the time during which the video conference is live. The image analyzer 408a, 408b can also access events one or more of the participants have indicated interest in via the social networking system 116. Furthermore, in at least one embodiment, the image analyzer 408a, 408b can utilize semantic analysis on audio data associated with one or more video channels to determine a purpose or context of a video conference. In one or more embodiments, regardless of the data upon which the image analyzer 408a, 408b bases its determination, the image analyzer 408a, 408b utilizes machine learning to determine the context of the video conference.

As shown in FIG. 4, and as mentioned above, the context manager 108a, 108b also includes an importance engine 410a, 410b. In one or more embodiments, the importance engine 410a, 410b utilizes the context and contents of a video conference to identify important areas within a still image taken from a video conference data stream (i.e., important people or important items), and to rank the importance of two or more video conference data streams. For example, the importance engine 410a, 410b identifies important areas within a still image by calculating an importance score for every identified participant and item within the still image. In at least one embodiment, the importance engine 410a, 410b then determines that an identified participant or item is "important" when its importance score is above a predetermined threshold.

In one or more embodiments, the importance engine 410a, 410b begins by calculating importance scores for each identified participant in a video conference data stream. As discussed above, the image analyzer 408a, 408b determines an identity (e.g., a name and other identifying information) for each participant in a still image taken from a video conference data stream. With the participant's identity, the importance engine 410a, 410b utilizes neural networks and/or machine learning to calculate an importance score for the participant in light of the context of the video conference. In one or more embodiments, the importance score is based on information obtained from a company server such as the participant's employment (e.g., a company CEO has a higher score than a team leader, a team leader has a higher score than a team member, etc.), the participant's seniority in his employment, the participant's income, the participant's number of subordinates, the participant's position within the company's organizational chart, etc. In at least one embodiment, the importance engine 410a, 410b assigns a value to each piece of information related to the participant, such that the participant's resulting importance score is a sum of the values assigned by the importance engine 410a, 410b.

Additionally, the importance score is based on social information obtained from the social networking system 116. In one or more embodiments, the importance engine 410a, 410b calculates a participant's importance score based on the participant's number of friends (e.g., a higher number of friends indicates more importance), how often the participant posts to the social networking system, a number of times the participant's posts are liked by other social networking system users, and a number of times the participant's posts are shared by other social networking system users. The importance engine 410a, 410b can further consider additional social networking system activity associated with the participant in calculating the participant's importance score. As with the participant's employment information, the importance engine 410a, 410b assigns a value to each piece of social networking system information associated with the participant.

In one or more embodiments, the importance engine 410a, 410b places a heavier weight on certain information associated with the participant in calculating the participant's importance score. For example, if all the identified people in a video conference work for the same company, the importance engine 410a, 410b may add extra weight to employment information. Alternatively, if only some of the identified people in a video conference work for the same company, the importance engine 410a, 410b may add extra weight to social networking system information.

Once the importance engine 410a, 410b has calculated an importance score for each participant identified within a video conference data stream, the importance engine 410a, 410b determines whether each identified participant is "important." For example, in at least one embodiment, the importance engine 410a, 410b determines that an identified participant is important if the participant's importance score is above a predetermined threshold. In one or more embodiments, the predetermined threshold is simply a number (e.g., for scores between 0 and 100, the predetermined threshold is 80), or may be a top percentage (e.g., the top ten percent of scores), or may be a ranking (e.g., if there are four participants shown in a video conference data stream, the threshold is the top two participants), and so forth. The importance engine 410a, 410b marks all identified participants in a video conference data stream with importance scores above the predetermined threshold to be important.

Next, the importance engine 410a, 410b calculates an importance score for all other items displayed within a video conference data stream. As discussed above, a video conference data stream may include items (e.g., displays, white boards, etc.) in addition to people. In one or more embodiments, the importance engine 410a, 410b can optimize a video conference data stream based on one or more important items. For example, in response to the image analyzer 408a, 408b determining that a video conference data stream shows a white board with writing on it, the importance engine 410a, 410b calculate an importance score for the white board. If the calculated importance score is above a predetermined threshold, the importance engine 410a, 410b will mark the white board as important.

In one or more embodiments, the importance engine 410a, 410b utilizes machine learning and/or neural networks to calculate an importance score for an item. For example, the importance score for an item is based on the item's size (e.g., larger items are more important), the item's location (e.g., items closer to video conference participants are more important), writing associated with the item (e.g., if an item has writing on it, as with a whiteboard, the item is more important), the contents of any writing associated with the item (e.g., if the writing is relevant to the purpose of the video conference, the item is more important), and the amount of blank space associated with the item (e.g., more blank space indicates the item is less important). In one or more embodiments, the important engine 410a, 410b determines whether the contents of any writing associated with the item is relevant based on natural language processing. In at least one embodiment, the importance engine 410a, 410b can also assign extra weight to certain pieces of information associated with an item, as described above.

Once the importance engine 410a, 410b has calculated an importance score for every participant and item identified within one or more video conference data streams, the importance engine 410a, 410b can rank the one or more video conference data streams. For example, in one or more embodiments, the importance engine 410a, 410b aggregates the importance scores of the people, items, and content identified within a video conference data stream to calculate an overall importance score for the video conference data stream. In at least one embodiment, the overall importance score for a video conference data stream is useful in optimizing the display of the video conference data stream.

As shown in FIG. 4, and as mentioned above, the context manager 108a, 108b also includes a video encoder 412a, 412b. As discussed above, the context manager 108a, 108b optimizes the broadcast or transmission of a video conference data stream such that important areas (e.g., important people and important items) are broadcast with greater clarity. Accordingly, in one or more embodiments, the video encoder 412a, 412b encodes or compresses a video conference data stream such that unimportant areas are subjected to a higher compression rate.

In one or more embodiments, the video encoder 412a, 412b begins the process of selectively encoding a video conference data stream by matching the identified important areas from the still image to corresponding areas within the video conference data stream from which the still image was captured. As discussed above, the context manager 108a, 108b performs context and content analysis on a still image taken from a video conference data stream. Accordingly, in at least one embodiment, the video encoder 412a, 412b utilizes computer vision and image processing to match reference points in the still image to reference points in the corresponding video conference data stream in order to identify the important areas in the video conference data stream.

Next, the video encoder 412a, 412b selectively compresses the video conference data stream. In one or more embodiments, the video encoder 412a, 412b utilizes standard video compression and encoding methods to compress or encode the video conference data stream. In at least one embodiment, while compressing or encoding the video conference data stream, the video encoder 412a, 412b can utilize different compression rates on different areas within the video conference data stream (e.g., using lossy encoding/compression). Accordingly, when the video encoder 412a, 412b encounters an area within the video conference data stream that has been deemed important, as described above, the video encoder 412a, 412b lossily encodes the important areas, such that they are transferred at a higher data rate. Alternatively, in at least one embodiment, the video encoder 412a, 412b does not compress important areas within a video conference data stream at all. In one or more embodiments, the video encoder 412a, 412b selectively compresses a video conference data stream at a broadcasting client-computing device. Alternatively, the video encoder 412a, 412b can selectively compress a video conference data stream on a bridge, depending on network topology.

As mentioned above, and as illustrated in FIG. 4, the context manager 108a, 108b also includes a display manager 414a, 414b. In one or more embodiments, the display manager 414a, 414b optimizes the display of one or more video conference data streams on one or more displays 106a, 106b associated with the client-computing devices 102a, 102b. As discussed above, the display manager 414a, 414b optimizes the display of one or more video conference data streams such that important people, items, and content are easier to see.

In one or more embodiments, the display manager 414a, 414b optimizes the display of one or more video conference data streams on the receiving client-computing device 102. For example, if the client-computing device 102a is transmitting a video conference data stream to the client-computing device 102b, the display manager 414b optimizes the display of the video conference data stream. In at least one alternative embodiment, however, if the client-computing device 102a is transmitting a video conference data stream to the client-computing device 102b, the display manager 414a may optimize the display of the video conference data stream prior to transmitting the video conference data stream to the client-computing device 102b.

In at least one embodiment, the display manager 414a, 414b optimizes one or more displays by zooming in or zooming out on a video conference data stream, splitting or consolidating a video conference data stream, enlarging or minimizing a video conference data stream, and so forth. For example, the display manager 414a, 414b utilizes machine learning and/or neural networks to determine how to optimize a display based on the number of important areas within a video conference data stream. For instance, if a video conference data stream includes several important people sitting close together, the display manager 414a, 414b may determine to zoom in on the group of important people. In another example, if a video conference data stream includes several important people interspersed with non-important people, the display manager 414a, 414b may split the video conference data stream into separate displays zoomed in on each of the important people.

Additionally, if a video conference includes two or more video conference data streams and the client-computing device 102a, 102b includes two or more displays 106a, 106b, the display manager 414a, 414b can rearrange the display of the two or more video conference data streams. For example, in response to determining that a presentation channel switches to a slide including small text, the importance engine 410a, 410b may increase the importance score associated with the presentation channel. In response to the change in importance score for the presentation channel, the display manager 414a, 414b may rearrange the displays 106a, 106b of the client-computing device 102a, 102b such that the presentation channel is displayed on a larger display.

In one or more embodiments, the context manager 108a, 108b can control the camera(s) 104a, 104b in response the analyses performed by components 408a, 408b through 414a, 414b. For example, as mentioned above, the camera(s) 104a, 104b can include one or more aspects such as swiveling, zooming in, zooming out, panning, tilting, cropping, view switching, and sound-based triangulation. As such, in at least one embodiment, the context manager 108a, 108b can change one or more of the aspects of the camera(s) 104a, 104b such that the camera(s) 104a, 104b focus on one or more of the identified important video conference participants.

Furthermore, in at least one embodiment, when switching between one or more cameras associated with a single client-computing device, the context manager 108a, 108b can compute various probabilities in order to optimize the display of the video conference. For example, the context manager 108a, 108b can utilize a probability analysis in combination with video, audio, and other information associated with the view of each camera of a client-computing device in order to identify an important focus (e.g., a speaker, a demonstration, etc.). The context manager 108a, 108b can then switch to the camera view that most advantageously displays the important focus. The context manager 108a, 108b can also take into account other information when switching camera views such as the time since the camera view was last switched.

Additionally, in some embodiments, the context manager 108a, 108b can take into account additional information when selectively compressing and/or optimizing the display of one or more video conference data streams. For example, in one embodiment, the context manager 108a, 108b can receive and analyze audio data associated with a video conference data stream in order to further identify one or more important video conference participants. Additionally or alternatively, the context manager 108a, 108b can receive and analyze movement information, metadata information, and any other type of video signal associated with the video conference data stream in order to further identify one or more important video conference participants.

Furthermore, as mentioned above, and as illustrated in FIG. 4, the context manager 108a, 108b includes data storage 416a, 416b. As shown, the data storage 416a, 416b includes video conference data stream data 418a, 418b and display data 420a, 420b. In one or more embodiments, the video conference data stream data 418a, 418b includes data representative of video conference data stream information, as described herein. Similarly, in one or more embodiments, the display data 420a, 420b includes data representative of display information, as described herein.

FIGS. 1-4, the corresponding text, and the examples, provide a number of different methods, systems, and devices for optimizing video conferences utilizing the video conferencing system 100. In addition to the foregoing, embodiment can also be described in terms of flowcharts comprising acts and steps in a method for accomplishing a particular result. For example, FIG. 5 may be performed with less or more steps/acts or the steps/acts may be performed in differing orders. Additionally, the steps/acts described herein may be repeated or performed in parallel with one another or in parallel with different instances of the same or similar steps/acts.

Figure 5:
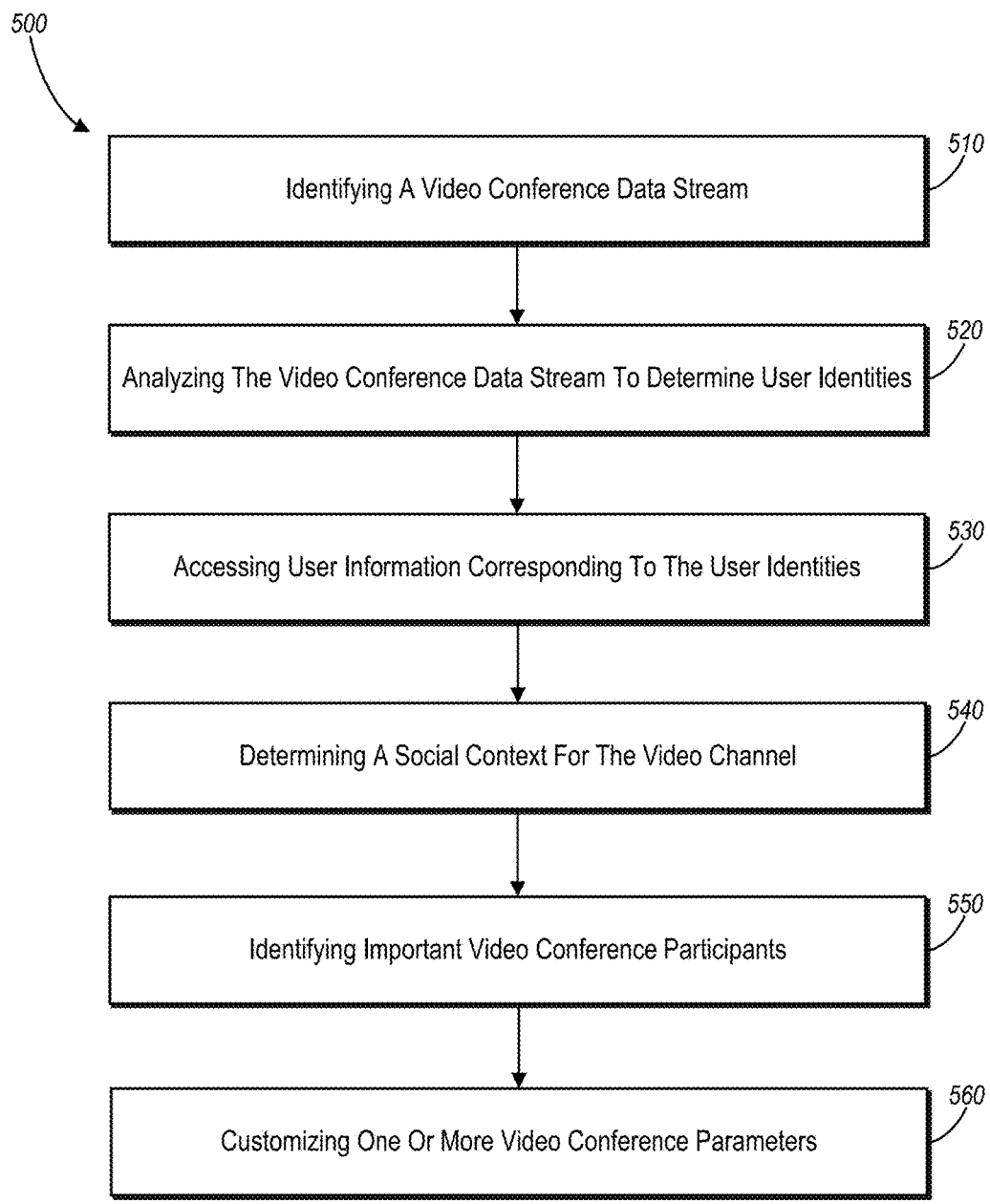
FIG. 5 illustrates a flowchart of a series of acts in a method of selectively compressing a video conference data stream in accordance with one or more embodiments.

FIG. 5 illustrates a flowchart of one example method 500 of optimizing the transmission of a video conference data stream. The method 500 includes an act 510 of identifying a video conference data stream. In particular, the act 510 involves identifying a video conference data stream including a video channel depicting a plurality of video conference participants.

The method 500 also includes an act 520 of analyzing the video conference data stream to determine user identities. In particular, the act 520 involves analyzing the video channel to determine a user identity for each participant of the plurality of video conference participants. In one or more embodiments, analyzing the video channel to determine a user identity for each participant of the plurality of video conference participants includes utilizing facial recognition to determine each user identity.

Furthermore, the method 500 includes an act 530 of accessing user information corresponding to the user identities. In particular, the act 530 involves accessing user information corresponding to the user identity for each participant of the plurality of video conference participants. In one or more embodiments, accessing user information corresponding to the user identity includes accessing at least one of social networking system information associated with each of the plurality of video conference participants and employment information associated with each of the plurality of video conference participants.

The method 500 also includes an act 540 of determining a social context for the video channel. In particular, the act 540 involves determining a social context for the video channel based at least in part on the accessed user information. For example, in one embodiment, determining a social context for the video channel further comprises analyzing metadata associated with the video channel in order to identify a purpose of a video conference depicted in the video channel.

The method 500 further includes an act 550 of identifying important video conference participants. In particular, the act 550 involves identifying, based on the accessed user information, one or more important video conference participants from the plurality of video conference participants. For example, in at least one embodiment, the method 500 further includes a step of determining a social context for the video channel by analyzing metadata associated with the video channel in order to identify a purpose of a video conference depicted in the video channel. In that embodiment, identifying the one or more important video conference participants from the plurality of video conference participants is further based on the determined social context for the video channel.

Further, the method 500 includes an act 560 of customizing one or more video conference parameters. In particular, the act 550 involves customizing one or more video conference parameters based on the identified one or more important video conference participants. In one or more embodiments, customizing the one or more video conference parameters further includes altering a plurality of camera aspects of one or more cameras to focus on the one or more important video conference participants. For example, the one or more camera aspects can include one or more of swiveling, zooming in, zooming out, panning, tilting, cropping, view switching, or sound-based triangulation. In at least one embodiment, customizing the one or more video conference parameters further comprises selectively compressing the video channel based on the identified one or more important video conference participants, wherein selectively compressing the video channel comprises selecting a higher quantization amount to use for one or more video portions corresponding to the identified one or more important video conference participants. Additionally, in at least one embodiment, the method 500 further includes analyzing the video channel to identify additional video information comprising audio information, movement information, and video metadata, wherein selectively compressing the video channel is further based on the analysis of the additional video information.

In one or more embodiments, the method 500 further includes selectively compressing the video channel based on the identified one or more important video conference participants. For example, in at least one embodiment selectively compressing the video channel based on the identified one or more important video conference participants includes compressing one or more video portions corresponding to the identified one or more important video conference participants at a first compression rate, and compressing at least one video portion not corresponding to the identified one or more important video conference participants at a second compression rate. For example, in at least one embodiment, compressing the at least one video portion not corresponding to the identified one or more important video conference participants at the second compression rate includes compressing a video portion corresponding to a conference participant that is not included in the identified one or more important video conference participants at the second compression rate. Also, in at least one embodiment, the first compression rate is a higher quality compression rate than the second compression rate.

In one or more embodiments, the method 500 also includes steps of assigning a score to one or more portions of the user information for each participant of the plurality of video conference participants, and determining a weighted value for the one or more portions the user information for each participant of the plurality of video conference participants based on the determined social context for the video channel. Additionally, the method 500 can also include determining an importance score for each of the plurality of video conference participants based on the determined weighted value and the assigned score for the one or more portions of the user information for each participant, wherein identifying the one or more important video conference participants is based on the importance score for each of the plurality of video conference participants. In at least one embodiment, the method 500 also includes calculating, based on the at least one of the social networking system information and the employment information, an importance score for each of the plurality of video conference participants, and wherein identifying one or more important video conference participants is based on the importance score for each of the plurality of video conference participants. Furthermore, in at least one embodiment, the method 500 includes determining whether the importance score for each of the plurality of conference participants meets a predetermined threshold, wherein identifying the one or more important video conference participants from the plurality of video conference participants is based on the determination that the importance score for the one or more important video conference participants meets the predetermined threshold.

Figure 6:
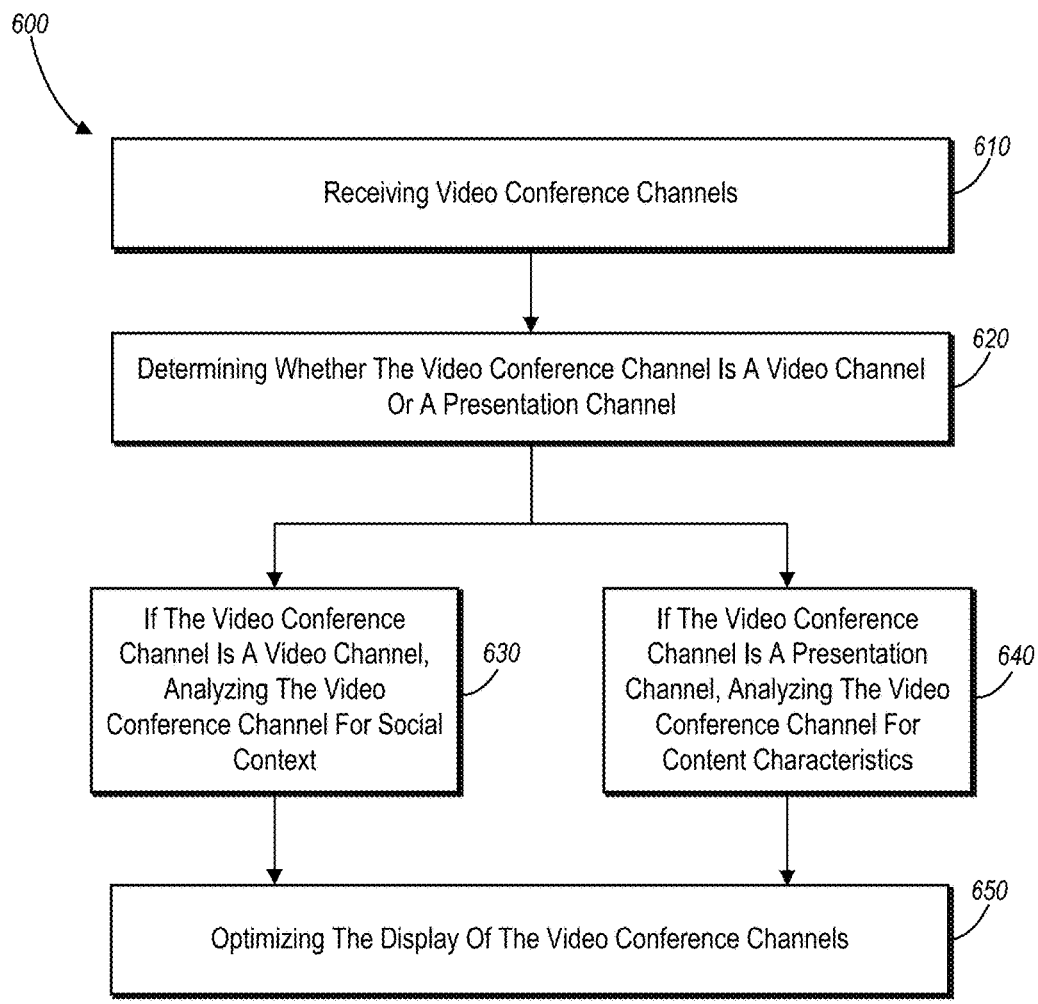
FIG. 6 illustrates a flowchart of a series of acts in a method of optimizing the display of one or more video conference data streams in accordance with one or more embodiments.

FIG. 6 illustrates a flowchart of an example method of optimizing a display of one or more video conference data streams. The method 600 includes an act 610 of receiving video conference channels. In particular, the act 610 involves receiving a plurality of video conference channels.

Additionally, the method 600 includes an act 620 of determining whether the video conference channel is a video channel or a presentation channel. In particular, the act 620 involves, for each video conference channel of the plurality of video conference channels, determining whether a video conference channel is a video channel or a presentation channel.

The method 600 then includes an act 630 of, if the video conference channel is a video channel, analyzing the video conference channel for social context. In particular, the act 630 involves, based on the determination that the video conference data stream is a video channel, analyzing the video conference channel to determine a social context for the video conference channel. In one or more embodiments, analyzing the video conference channel to determine a social context includes determining a user identity for one or more video conference participants depicted within the video conference channel, and analyzing user information for each of the one or more video conference participants, wherein user information comprises employment information and social networking system information.

The method 600 further includes an act 640 of, if the video conference channel is a presentation channel, analyzing the video conference channel for content characteristics. In particular, the act 640 involves, based on the determination that the video conference channel is a presentation channel, analyzing the video conference channel to determine content characteristics of the video conference channel. For example, in at least one embodiment, analyzing the video conference channel to determine content characteristics of the video conference channel includes analyzing readability features of the video conference channel.

Additionally, the method 600 includes an act 650 of optimizing the display of the video conference channels. In particular, the act 650 involves optimizing, based on the analysis of each of the plurality of video conference channels, a display of the plurality of video conference channels. In one or more embodiments, optimizing the display of the plurality of video conference channels includes at least one of: modifying a display size associated with at least one of the plurality of video conference channels; repositioning a display position associated with at least one of the plurality of video conference channels; and adjusting a zoom or crop factor associated with at least one of the plurality of video conference data streams.

The method 600 can also include and act of calculating an importance score for each of the plurality of video conference channels. In one or more embodiments, the method 600 also includes, for each of the plurality of video conference channels determined to be a video channel: identifying one or more participants displayed in the video channel; and calculating a participant score for each of the identified one or more participants based on user information associated with each of the identified one or more participants, wherein calculating the importance score for the video channel is based on the participant score for each of the identified one or more participants. In at least one embodiment, the method 600 further includes, for each of the plurality of video conference channels determined to be a presentation channel: identifying one or more items displayed in the presentation channel; calculating an item score for each of the identified one or more items; wherein calculating the importance score for the presentation channel is based on the item score for each of the identified one or more items. As such, in at least one embodiment, optimizing the display of the plurality of video conference channels is further based on the calculated importance score for each of the plurality of video conference channels.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
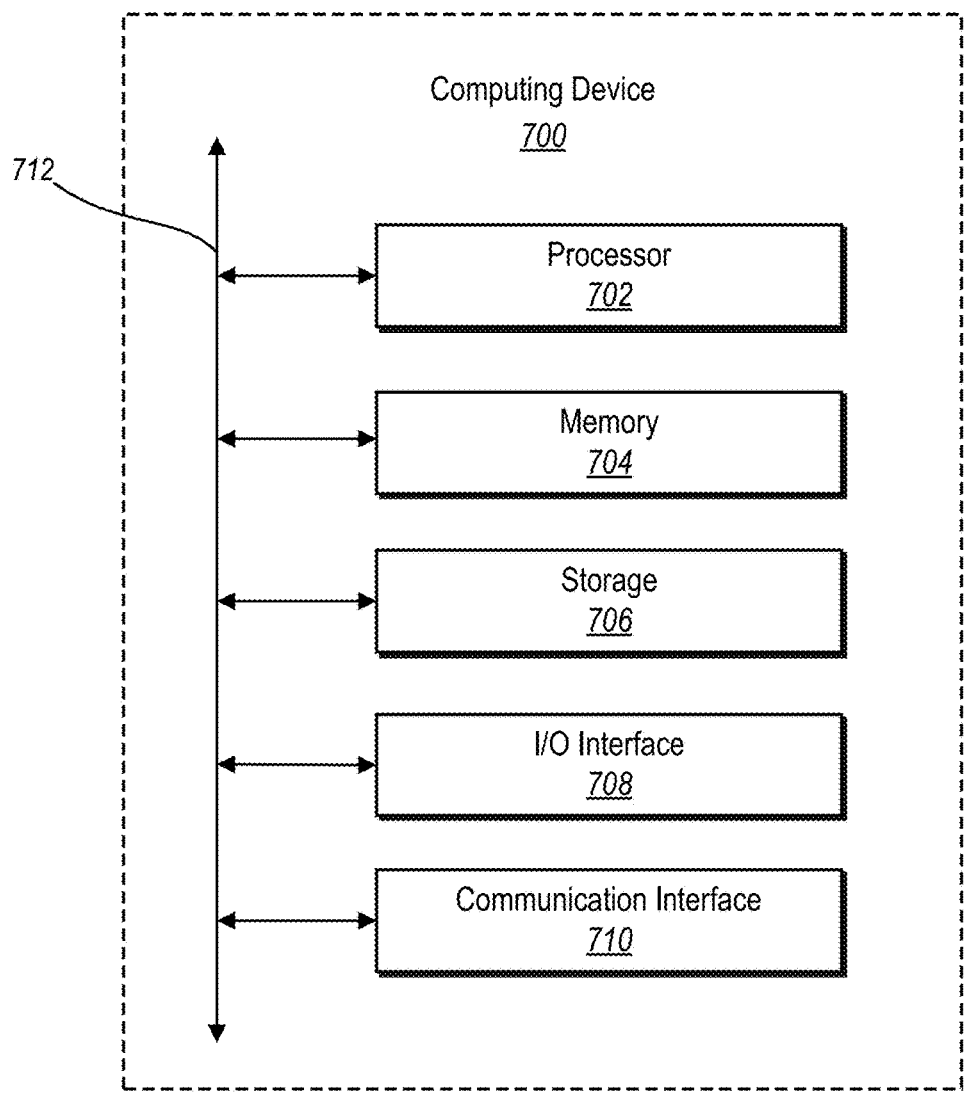
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, video-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 8:
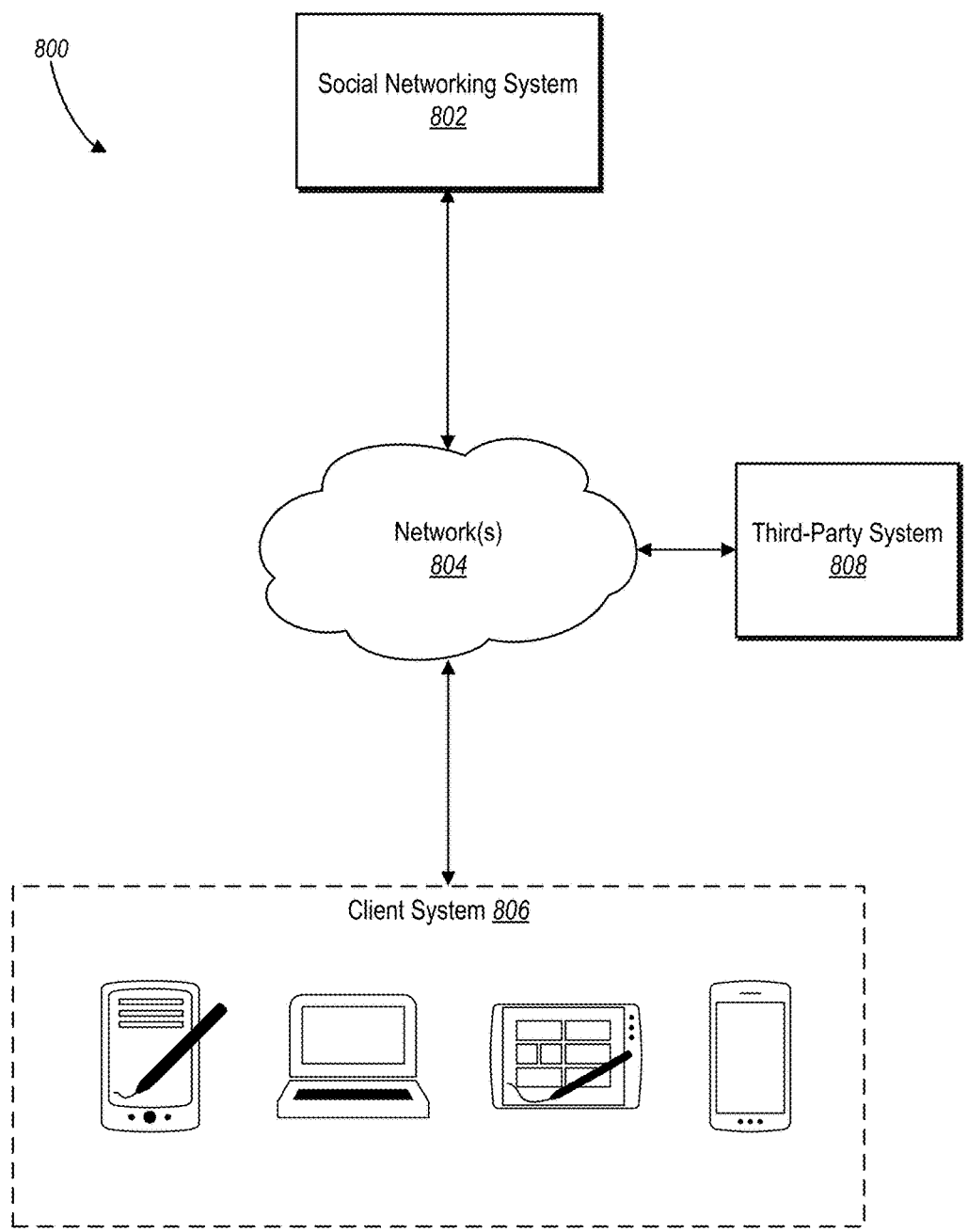
FIG. 8 is an example network environment of a social networking system in accordance with one or more embodiments.

FIG. 8 illustrates an example network environment 800 of a social networking system. Network environment 800 includes a client system 806, a social networking system 802, and a third-party system 808 connected to each other by a network 804. Although FIG. 8 illustrates a particular arrangement of client system 806, social networking system 802, third-party system 808, and network 804, this disclosure contemplates any suitable arrangement of client system 806, social networking system 802, third-party system 808, and network 804. As an example and not by way of limitation, two or more of client system 806, social networking system 802, and third-party system 808 may be connected to each other directly, bypassing network 804. As another example, two or more of client system 806, social networking system 802, and third-party system 808 may be physically or logically co-located with each other in whole or in part. Moreover, although FIG. 8 illustrates a particular number of client systems 806, social networking systems 802, third-party systems 808, and networks 804, this disclosure contemplates any suitable number of client systems 806, social networking systems 802, third-party systems 808, and networks 804. As an example and not by way of limitation, network environment 800 may include multiple client system 806, social networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806, social networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 806. A client system 806 may enable a network user at client system 806 to access network 804. A client system 806 may enable its user to communicate with other users at other client systems 806.

In particular embodiments, client system 806 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 802 may be a network-addressable computing system that can host an online social network. Social networking system 802 may generate, store, receive, and send social-networking data, such as, for example, user-profile data, concept-profile data, social-graph information, or other suitable data related to the online social network. Social networking system 802 may be accessed by the other components of network environment 800 either directly or via network 804. In particular embodiments, social networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 806, a social networking system 802, or a third-party system 808 to manage, retrieve, modify, add, or delete, the information stored in data store.

In particular embodiments, social networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 802 may provide users of the online social network the ability to communicate and interact with other users. In particular embodiments, users may join the online social network via social networking system 802 and then add connections (e.g., relationships) to a number of other users of social networking system 802 whom they want to be connected to. Herein, the term "friend" may refer to any other user of social networking system 802 with whom a user has formed a connection, association, or relationship via social networking system 802.

In particular embodiments, social networking system 802 may provide users with the ability to take actions on various types of items or objects, supported by social networking system 802. As an example and not by way of limitation, the items and objects may include groups or social networks to which users of social networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 802 or by an external system of third-party system 808, which is separate from social networking system 802 and coupled to social networking system 802 via a network 804.

In particular embodiments, social networking system 802 may be capable of linking a variety of entities. As an example and not by way of limitation, social networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social networking system 802. In particular embodiments, however, social networking system 802 and third-party systems 808 may operate in conjunction with each other to provide social-networking services to users of social networking system 802 or third-party systems 808. In this sense, social networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client system 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 802 also includes user-generated content objects, which may enhance a user's interactions with social networking system 802. User-generated content may include anything a user can add, upload, send, or "post" to social networking system 802. As an example and not by way of limitation, a user communicates posts to social networking system 802 from a client system 806. Posts may include data such as status updates or other textual data, location information, photos, videos, links, music or other similar data or media. Content may also be added to social networking system 802 by a third-party through a "communication channel," such as a newsfeed or stream.

In particular embodiments, social networking system 802 may include a variety of servers, sub-systems, programs, modules, logs, and data stores. In particular embodiments, social networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 802 may also include suitable components such as network interfaces, security mechanisms, load balancers, failover servers, management-and-network-operations consoles, other suitable components, or any suitable combination thereof. In particular embodiments, social networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 802 to one or more client systems 806 or one or more third-party system 808 via network 804. The web server may include a mail server or other messaging functionality for receiving and routing messages between social networking system 802 and one or more client systems 806. An API-request server may allow a third-party system 808 to access information from social networking system 802 by calling one or more APIs. An action logger may be used to receive communications from a web server about a user's actions on or off social networking system 802. In conjunction with the action log, a third-party-content-object log may be maintained of user exposures to third-party-content objects. A notification controller may provide information regarding content objects to a client system 806. Information may be pushed to a client system 806 as notifications, or information may be pulled from client system 806 responsive to a request received from client system 806. Authorization servers may be used to enforce one or more privacy settings of the users of social networking system 802. A privacy setting of a user determines how particular information associated with a user can be shared. The authorization server may allow users to opt in to or opt out of having their actions logged by social networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client systems 806 associated with users. Advertisement-pricing modules may combine social information, the current time, location information, or other suitable information to provide relevant advertisements, in the form of notifications, to a user.

Figure 9:
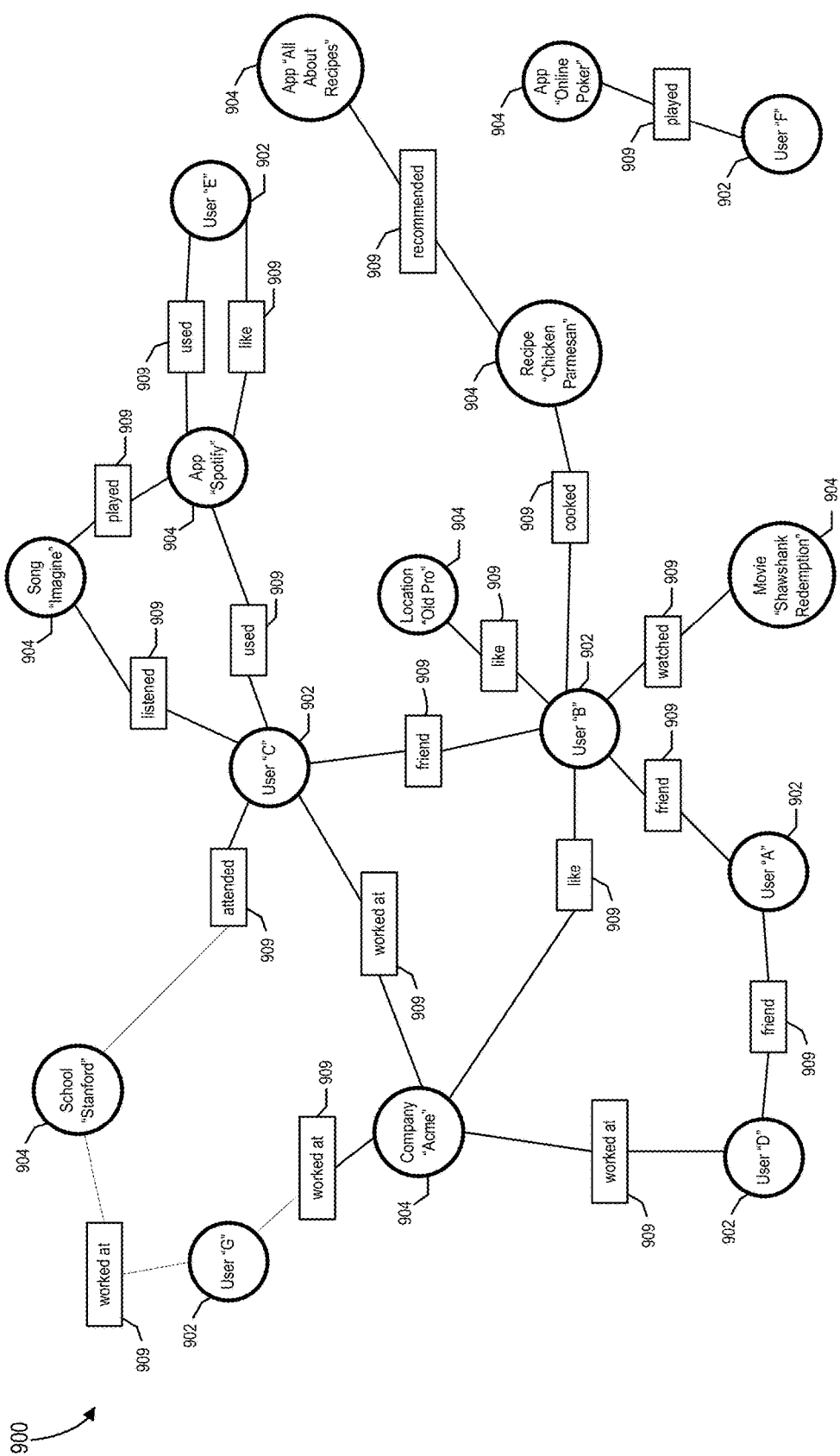
FIG. 9 illustrates a social graph in accordance with one or more embodiments.

FIG. 9 illustrates example social graph 900. In particular embodiments, social networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social networking system 802, client system 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social networking system 802. As an example and not by way of limitation, a user may be an individual (human user), an entity (e.g., an enterprise, business, or third-party application), or a group (e.g., of individuals or entities) that interacts or communicates with or over social networking system 802. In particular embodiments, when a user registers for an account with social networking system 802, social networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social networking system 802. In particular embodiments, a user node 902 may be associated with information provided by a user or information gathered by various systems, including social networking system 802. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social networking system 802. Profile pages may also be hosted on third-party websites associated with a third-party server 908. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 806 to send to social networking system 802 a message indicating the user's action. In response to the message, social networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social networking system 802 may send a "friend request" to the second user. If the second user confirms the "friend request," social networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social networking system 802 may create an edge 906 between a user node 902 and a concept node 904 in social graph 900. As an example and not by way of limitation, a user viewing a concept-profile page (such as, for example, by using a web browser or a special-purpose application hosted by the user's client system 806) may indicate that he or she likes the concept represented by the concept node 904 by clicking or selecting a "Like" icon, which may cause the user's client system 806 to send to social networking system 802 a message indicating the user's liking of the concept associated with the concept-profile page. In response to the message, social networking system 802 may create an edge 906 between user node 902 associated with the user and concept node 904, as illustrated by "like" edge 906 between the user and concept node 904. In particular embodiments, social networking system 802 may store an edge 906 in one or more data stores. In particular embodiments, an edge 906 may be automatically formed by social networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a newsfeed or ticker item on social networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within newsfeeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 802) or RSVP (e.g., through social networking system 802) to an event associated with the advertisement. In addition or as an alternative, an advertisement may include social-networking-system context directed to the user. As an example and not by way of limitation, an advertisement may display information about a friend of the user within social networking system 802 who has taken an action associated with the subject matter of the advertisement.

In particular embodiments, social networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 802 may calculate a coefficient based on a user's actions. Social networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social networking system 802 may analyze a user's actions to determine whether one or more of the actions indicate an affinity for subject matter, content, other users, and so forth. As an example and not by way of limitation, if a user may make frequently posts content related to "coffee" or variants thereof, social networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 802 may calculate a coefficient based on the type of relationship between particular objects. Referencing the social graph 900, social networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user node 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 802 may determine that the user has a higher coefficient with respect to the first photo than the second photo because having a tagged-in-type relationship with content may be assigned a higher weight and/or rating than having a like-type relationship with content. In particular embodiments, social networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 802 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 806 of the user). A first user may be more interested in other users or concepts that are closer to the first user. As an example and not by way of limitation, if a user is one mile from an airport and two miles from a gas station, social networking system 802 may determine that the user has a higher coefficient for the airport than the gas station based on the proximity of the airport to the user.

In particular embodiments, social networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 802 may provide information that is relevant to user's interests and current circumstances, increasing the likelihood that they will find such information of interest. In particular embodiments, social networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social networking system 802 may calculate the coefficient (or access the coefficient information if it has previously been calculated and stored). In particular embodiments, social networking system 802 may measure an affinity with respect to a particular process. Different processes (both internal and external to the online social network) may request a coefficient for a particular object or set of objects. Social networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 802 may send a request to the data store for the object. The request may identify the user associated with the request and may only be sent to the user (or a client system 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   receiving a first video conference channel and a second video conference channel;
   determining, by at least one processor, that the first video conference channel is a video channel and that the second video conference channel is a presentation channel;
   in response to determining that the first video conference channel is a video channel, analyzing the first video conference channel to determine a social context for the first video conference channel by accessing social networking system information to determine an identity and user information for at least one video conference participant depicted within the first video conference channel;
   in response to determining that the second video conference channel is a presentation channel, analyzing the second video conference channel to determine content characteristics of the second video conference channel; and
   optimizing, by the at least one processor and based on the analysis of the first video conference channel and the second video conference channel, a single display comprising the first video conference channel and the second video conference channel.

2. The method as recited in claim 1, wherein optimizing the single display comprising the first video conference channel and the second video conference channel comprises at least one of:
   modifying a display size associated with at least one of the first video conference channel and the second video conference channel;
   repositioning a display position associated with at least one of the first video conference channel and the second video conference channel; and
   adjusting at least one of a zoom factor and a crop factor associated with at least one of the first video conference channel and the second video conference channel.

3. The method as recited in claim 1, wherein analyzing the first video conference channel to determine a social context further comprises:
   determining a user identity for the at least one video conference participant depicted within the first video conference channel; and
   analyzing user information for the at least one video conference participant, wherein user information comprises employment information.

4. The method as recited in claim 1, wherein analyzing the second video conference channel to determine content characteristics of the second video conference channel comprises analyzing readability features of the second video conference channel.

5. The method as recited in claim 1, further comprising calculating an importance score for each of the first video conference channel and the second video conference channel.

6. The method as recited in claim 5, further comprising:
for the first video conference channel determined to be a video channel:
identifying at least one participant displayed in the video channel; and
calculating a participant score for the at least one identified participant based on user information and social networking system information associated with the at least one identified participant,
wherein calculating the importance score for the video channel is based on the participant score for the at least one identified participant.

7. The method as recited in claim 6, further comprising:
for the second video conference channel determined to be a presentation channel:
identifying one or more items displayed in the presentation channel;
calculating an item score for each of the identified one or more items; and
wherein calculating the importance score for the presentation channel is based on the item score for each of the identified one or more items.

8. The method as recited in claim 7, wherein optimizing the single display comprising the first video conference channel and the second video conference channel is further based on the calculated importance score for the first video conference channel and the second video conference channel.

9. A system comprising:
at least one processor; and
at least one non-transitory computer-readable storage medium storing instructions thereon that, when executed by the at least one processor, cause the system to:
identify a first video conference channel and a second video conference channel;
determine that the first video conference channel is a video channel and that the second video conference channel is a presentation channel;
in response to determining that the first video conference channel is a video channel, analyze the first video conference channel to determine a social context for the first video conference channel by accessing social networking system information to determine an identity and user information for at least one video conference participant depicted within the first video conference channel;
in response to determining that the second video conference channel is a presentation channel, analyze the second video conference channel to determine content characteristics of the second video conference channel;
optimize, based on the analysis of the first video conference channel and the second video conference channel, a single display comprising the first video conference channel and the second video conference channel.

10. The system as recited in claim 9, wherein optimizing the single display comprising the first video conference channel and the second video conference channel comprises modifying a display size associated with at least one of the first video conference channel and the second video conference channel.

11. The system as recited in claim 9, further comprising instructions that, when executed by the at least one processor, cause the system to detect updated content characteristics of the second video conference channel.

12. The system as recited in claim 11, further comprising instructions that, when executed by the at least one processor, cause the system to re-optimize the single display comprising the first video conference channel and the second video conference channel based on the updated content characteristics.

13. The system as recited in claim 12, wherein re-optimizing the single display comprising the first video conference channel and the second video conference channel based on the updated content characteristics comprises one or more of:
modifying a display size associated with at least one of the first video conference channel and the second video conference channel;
repositioning a display position associated with at least one of the first video conference channel and the second video conference channel; and
adjusting a zoom factor associated with at least one of the first video conference channel and the second video conference channel.

14. The system as recited in claim 13, wherein re-optimizing the single display comprising the first video conference channel and the second video conference channel based on the updated content characteristics further comprises modifying a display size associated with a third video conference channel added to the single display comprising the first video conference channel and the second video conference channel.

15. The system as recited in claim 9, wherein analyzing the first video conference channel to determine a social context for the first video conference channel further comprises:
determining a user identity for the at least one video conference participant depicted within the first video conference channel; and
analyzing user information for the at least one video conference participant, wherein user information comprises employment information.

16. The system as recited in claim 9, wherein analyzing the second video conference channel to determine content characteristics of the second video conference channel comprises analyzing readability features of the second video conference channel.

17. The system as recited in claim 9, further comprising instructions that, when executed by the at least one processor, cause the system to determine an importance score associated with each of the first video conference channel and the second video conference channel, and wherein optimizing the single display comprising the first video conference channel and the second video conference channel is further based on the importance score.

18. A non-transitory computer-readable medium storing instructions thereon that, when executed by at least one processor, cause a computer system to:
identify a first video conference channel and a second video conference channel;
determine that the first video conference channel is a video channel and that the second video conference channel is a presentation channel;
in response to determining that the first video conference channel is a video channel, analyze the first video conference channel to determine a social context for the first video conference channel by accessing social networking system information to determine an identity and user information for at least one video conference participant depicted within the first video conference channel;

in response to determining that the second video conference channel is a presentation channel, analyze the second video conference channel to determine content characteristics of the second video conference channel; and optimize, based on the analysis of the first video conference channel and the second video conference channel, a single display comprising the first video conference channel and the second video conference channel.

19. The non-transitory computer-readable medium as recited in claim 18, further comprising instructions that, when executed by the at least one processor, cause the computer system to detect a change in at least one of the social context for the first video conference channel and the content characteristics of the second video conference channel.

20. The non-transitory computer-readable medium as recited in claim 19, further comprising re-optimizing the single display comprising the first video conference channel and the second video conference channel based on the detected change.

* * * * *